(12) United States Patent
Hayami et al.

(10) Patent No.: US 8,611,411 B2
(45) Date of Patent: Dec. 17, 2013

(54) EQUALIZER AND EQUALIZATION METHOD

(75) Inventors: Atsushi Hayami, Yokohama (JP); Makoto Itonaga, Yokohama (JP)

(73) Assignee: JVC Kenwood Corporation, Yokohama-shi (JP)

( * ) Notice: Subject to any disclaimer, the term of this patent is extended or adjusted under 35 U.S.C. 154(b) by 121 days.

(21) Appl. No.: 13/256,608

(22) PCT Filed: Mar. 18, 2010

(86) PCT No.: PCT/JP2010/001971
§ 371 (c)(1),
(2), (4) Date: Sep. 14, 2011

(87) PCT Pub. No.: WO2010/106810
PCT Pub. Date: Sep. 23, 2010

(65) Prior Publication Data
US 2012/0002712 A1    Jan. 5, 2012

(30) Foreign Application Priority Data

Mar. 19, 2009 (JP) ................................. 2009-068949
Mar. 24, 2009 (JP) ................................. 2009-072812
Mar. 5, 2010 (JP) ................................. 2010-049358

(51) Int. Cl.
*H03H 7/30* (2006.01)
(52) U.S. Cl.
USPC ........................................................ 375/232
(58) Field of Classification Search
USPC .............................. 375/232; 369/59; 714/795
See application file for complete search history.

(56) References Cited

U.S. PATENT DOCUMENTS

| | | | |
|---|---|---|---|
| 6,052,349 A * | 4/2000 | Okamoto | 369/47.26 |
| 6,931,585 B1 * | 8/2005 | Burd et al. | 714/795 |
| 2002/0067677 A1 | 6/2002 | Miyashita et al. | |
| 2005/0226316 A1 | 10/2005 | Higashino et al. | |

FOREIGN PATENT DOCUMENTS

| | | |
|---|---|---|
| CN | 1681029 A | 10/2005 |
| JP | 7-152716 A | 6/1995 |
| JP | 10-106158 A | 4/1998 |
| JP | 11-55132 A | 2/1999 |
| JP | 2002-050125 A | 2/2002 |
| JP | 2003-085764 A | 3/2003 |
| JP | 2005-302130 A | 10/2005 |
| JP | 2005-303361 A | 10/2005 |
| JP | 2007-048353 A | 2/2007 |
| JP | 2001-196977 A | 7/2007 |
| JP | 2008-276931 A | 11/2008 |

OTHER PUBLICATIONS

Office Action issued in Chinese Patent Application No. 201080012536.5 dated Sep. 22, 2013.

* cited by examiner

*Primary Examiner* — Daniel Washburn
*Assistant Examiner* — Fitwi Hailegiorgis
(74) *Attorney, Agent, or Firm* — Venable LLP; Michael A. Sartori; Christopher B. Tokarczyk

(57) ABSTRACT

A linear equalizer unit sequentially subjects a signal to be processed to linear equalization. A temporary decision unit sequentially subjects a signal subjected to linear equalization by the linear equalizer unit to temporary decision. A nonlinear equalizer unit derives a plurality of coefficients using a signal subjected to temporary decision as a teacher signal and sequentially subject a signal subjected to linear equalization by the linear equalizer unit to nonlinear equalization based on the plurality of coefficients.

8 Claims, 26 Drawing Sheets

| MEMORY VALUE | b(k) | b(k-1) | b(k-2) | b(k-3) | b(k-4) | TEMPORARY DECISION OUTPUT |
|---|---|---|---|---|---|---|
| 0 | 0 | 0 | 0 | 0 | 0 | -4 |
| 1 | 0 | 0 | 0 | 0 | 1 | -3 |
| 3 | 0 | 0 | 0 | 1 | 1 | -1 |
| 6 | 0 | 0 | 1 | 1 | 0 | 0 |
| 7 | 0 | 0 | 1 | 1 | 1 | 1 |
| 12 | 0 | 1 | 1 | 0 | 0 | 0 |
| 14 | 0 | 1 | 1 | 1 | 0 | 2 |
| 15 | 0 | 1 | 1 | 1 | 1 | 3 |
| 16 | 1 | 0 | 0 | 0 | 0 | -3 |
| 17 | 1 | 0 | 0 | 0 | 1 | -2 |
| 19 | 1 | 0 | 0 | 1 | 1 | 0 |
| 24 | 1 | 1 | 0 | 0 | 0 | -1 |
| 25 | 1 | 1 | 0 | 0 | 1 | 0 |
| 28 | 1 | 1 | 1 | 0 | 0 | 1 |
| 30 | 1 | 1 | 1 | 1 | 0 | 3 |
| 31 | 1 | 1 | 1 | 1 | 1 | 4 |

| MEMORY VALUE | b(k) | b(k-1) | b(k-2) | b(k-3) | b(k-4) | TEMPORARY DECISION OUTPUT |
|---|---|---|---|---|---|---|
| 0 | 0 | 0 | 0 | 0 | 0 | -4 |
| 1 | 0 | 0 | 0 | 0 | 1 | -3 |
| 3 | 0 | 0 | 0 | 1 | 1 | -1 |
| 6 | 0 | 0 | 1 | 1 | 0 | 0 |
| 7 | 0 | 0 | 1 | 1 | 1 | 1 |
| 12 | 0 | 1 | 1 | 0 | 0 | 0 |
| 14 | 0 | 1 | 1 | 1 | 0 | 2 |
| 15 | 0 | 1 | 1 | 1 | 1 | 3 |
| 16 | 1 | 0 | 0 | 0 | 0 | -3 |
| 17 | 1 | 0 | 0 | 0 | 1 | -2 |
| 19 | 1 | 0 | 0 | 1 | 1 | 0 |
| 24 | 1 | 1 | 0 | 0 | 0 | -1 |
| 25 | 1 | 1 | 0 | 0 | 1 | 0 |
| 28 | 1 | 1 | 1 | 0 | 0 | 1 |
| 30 | 1 | 1 | 1 | 1 | 0 | 3 |
| 31 | 1 | 1 | 1 | 1 | 1 | 4 |

1096

EQUALIZER AND EQUALIZATION METHOD

TECHNICAL FIELD

The present invention relates to equalizers and, more particularly, to an equalizer and a equalization method for equalizing nonlinear distortion.

BACKGROUND ART

The combined use of a partial response linear waveform equalizer circuit and Viterbi decoding is effective to decode a reproduction signal detected from an optical disk properly. This is indicated in, for example, High-Definition DVD (HD DVD)-ROM Part 1 (physical specification) published by DVD Forum. A disk control circuit in an optical disk player compatible with the standard rotates an optical disk at a predetermined rotation speed. An optical pickup reads a reproduction signal recorded on the optical disk. The reproduction signal is amplified by a preamplifier and amplified by an AGC circuit to a predetermined amplitude.

Further, the reproduction signal is subject to A/D conversion, subject to waveform equalization by a linear waveform equalizer circuit, and decoded by Viterbi decoding. As a result, image data and music data recorded on the optical disk are reproduced. As the recording density of an optical disk is increased, nonlinear distortion in the reproduced waveform is increased so that a linear waveform equalizer circuit alone is not sufficient to reduce distortion. For this reason, a nonlinear waveform equalizer circuit is used to reduce nonlinear distortion. A neural network is used to implement a nonlinear waveform equalizer circuit (see, for example, patent document 1).

[patent document No. 1] JP 10-106158

Problem to be Solved by the Invention

Generally, it is necessary to run a learning process in advance using a known training signal in order to allow a neural network to perform a desired operation. For example, a training signal is recorded at a predetermined location on an optical disk. An output corresponding to the training signal is used as a teacher signal to determine coefficients in the neural network. Thus, since a training signal is recorded on an optical disk, the use efficiency of the optical disk is reduced. The coefficients remain fixed once the learning process is completed. It is therefore difficult to track variation in the characteristics of a reproduction waveform within the plane of the optical disk. It is also difficult for the related-art approach to tack variation in power of a recorder used to record data in an optical disk. Thus, there is a need to adaptively reduce linear distortion and adaptively reduce nonlinear distortion in a reproduction signal resulting from improvement in the recording density or variation in the recording power, without using a training signal.

The present invention addresses the issue and a purpose thereof is to provide a technology of reducing nonlinear distortion in a reproduction signal resulting from improvement in the recording density or variation in the recording power, without using a training signal.

Means to Solve the Problem

An equalizer addressing the aforementioned problem comprises: a linear equalizer unit configured to sequentially subject a signal to be processed to linear equalization; a temporary decision unit configured to sequentially subject a signal subjected to linear equalization by the linear equalizer unit to temporary decision; and a nonlinear equalizer unit configured to derive a plurality of coefficients using a signal subjected to temporary decision by the temporary decision unit as a teacher signal and sequentially subject a signal subjected to linear equalization by the linear equalizer unit to nonlinear equalization based on the plurality of coefficients.

According to the embodiment, the result of temporary decision on a linear equalization signal is used as a teacher signal so that the coefficients for nonlinear equalization can be derived without using a training signal.

The temporary decision unit may perform temporary decision according to a partial response rule. Since temporary decision in compliance with the partial response rule is performed in this case, the system is compatible with a partial response process.

The equalizer may further comprise: a delay unit configured to delay a signal subjected to nonlinear equalization by the nonlinear equalizer unit. The delay unit may delay the signal for a duration commensurate with the difference between processing delay in the temporary decision unit and processing delay in the nonlinear equalizer unit, and the nonlinear equalizer unit may derive the plurality of coefficients based on the difference between a signal delayed by the delay unit and a signal subjected to temporary decision by the temporary decision unit. In this case, the signal is delayed for a duration commensurate with the difference between the processing delay in the temporary decision unit and the processing delay in the nonlinear equalizer unit. Therefore, the timing of the delayed signal and the timing of the temporary decision signal can be aligned.

The nonlinear equalizer unit may derive a plurality of new coefficients when the difference grows larger than a threshold value. In this case, since a plurality of new coefficients are derived when divergence is detected, degradation in the equalization characteristics is mitigated.

Another embodiment of the present invention relates to an equalization method. The method may comprise: sequentially subjecting a signal to be processed to linear equalization; sequentially subjecting a signal subjected to linear equalization to temporary decision; and deriving a plurality of coefficients using a signal subjected to temporary decision as a teacher signal and sequentially subjecting a signal subjected to linear equalization to nonlinear equalization based on the plurality of coefficients.

Another embodiment of the present invention relates to an equalizer. The equalizer comprises: an input unit configured to sequentially receive a signal to be processed; a linear equalizer unit configured to sequentially subject the signal input to the input unit to linear equalization; an adaptive nonlinear equalizer unit configured to sequentially subject the signal input to the input unit to nonlinear equalization in parallel with the linear equalization by the linear equalizer unit; an adder unit configured to add a signal subjected to nonlinear equalization by the nonlinear equalizer unit and a signal subjected to linear equalization by the linear equalizer unit; and a temporary decision unit configured to sequentially subject a signal resulting from the addition in the adder unit to temporary decision. The adaptive nonlinear equalizer unit derives a plurality of coefficients using a signal subjected to temporary decision by the temporary decision unit as a teacher signal and performs nonlinear equalization based on the plurality of coefficients.

According to the embodiment of the present invention, linear equalization and nonlinear equalization are performed in parallel, the linear equalization signal and the nonlinear equalization signal are added, and the result of subjecting the sum signal to temporary decision is used as a teacher signal. Therefore, the coefficients for nonlinear equalization can be derived without using a training signal.

The linear equalizer unit and the nonlinear equalizer unit may share a multistage tap. In this case, the circuit scale is prevented from increasing since a multistage tap is shared.

The temporary decision unit may perform temporary decision according to a partial response rule. Since temporary decision in compliance with the partial response rule is performed in this case, the system is compatible with a partial response process.

The equalizer may further comprise: a decision unit configured to determine whether the plurality of coefficients in the adaptive nonlinear equalizer unit converge. Unless the decision unit determines that convergence takes place, the adder unit may output the signal subjected to linear equalization by the linear equalizer unit to the temporary decision unit and output a signal resulting from the addition to the temporary decision unit after the decision unit determines that convergence takes place. In this case, the nonlinear equalization signal is not output to the temporary decision unit until the coefficients for nonlinear equalization converge so that degradation of precision of a temporary decision signal is mitigated.

The equalizer may further comprise: a first delay unit configured to delay a signal subjected to linear equalization by the linear equalizer unit; and a second delay unit configured to delay a signal subjected to nonlinear equalization by the adaptive nonlinear equalizer unit. The first delay unit may delay the signal for a duration commensurate with processing delay in the temporary decision unit, the second delay unit may delay the signal for a duration commensurate with processing delay in the temporary decision unit, the adaptive nonlinear equalizer unit may derive a plurality of coefficients based on a difference between a signal subjected to temporary decision by the temporary decision unit and a sum of a signal delayed by the first delay unit and a signal delayed by the second delay unit, and the linear equalizer unit may perform linear equalization using a plurality of coefficients, derive the plurality of coefficients based on a difference between a signal subjected to temporary decision by the temporary decision unit and a signal delayed by the first delay unit until the decision unit determines that convergence takes place, and derive the plurality of coefficients based on a difference between a signal subjected to temporary decision by the temporary decision unit and a sum of a signal delayed by the first delay unit and a signal delayed by the second delay unit after the decision unit determines that convergence takes place. In this case, since the nonlinear equalization signal is not used to derive the coefficients for linear equalization until the coefficients for nonlinear equalization converge, degradation in precision of deriving the coefficients is mitigated.

The equalizer may further comprise: an adder unit configured to add a signal subjected to linear equalization by the linear equalizer unit and a signal subjected to nonlinear equalization by the nonlinear equalizer unit; and a delay unit configured to delay a signal output from the adder. The delay unit may delay the signal for a duration commensurate with processing delay in the temporary decision unit, and the adaptive nonlinear equalizer unit may derive the plurality of coefficients based on a difference between a signal delayed by the delay unit and a signal subjected to temporary decision by the temporary decision unit, and the linear equalizer may perform linear equalization using a plurality of coefficients and use fixed values are as the plurality of coefficients. According to this variation, the stability of the equalization process is improved since the coefficients for linear equalization are fixed.

The adaptive nonlinear equalizer unit may derive a plurality of new coefficients when divergence of the plurality of coefficients is detected. In this case, since a plurality of new coefficients are derived when divergence is detected, degradation in the equalization characteristics is mitigated.

Still another embodiment of the present invention relates to an equalization method. The method comprises: sequentially subjecting an input signal to linear equalization; sequentially subjecting the input signal to nonlinear equalization in parallel with the linear equalization; adding a signal subjected to nonlinear equalization and a signal subjected to linear equalization; and sequentially subjecting a signal resulting from the addition to temporary decision. The subjecting of the input signal to nonlinear equalization comprises deriving a plurality of coefficients using a signal subjected to temporary decision as a teacher signal and performing nonlinear equalization based on the plurality of coefficients.

Optional combinations of the aforementioned constituting elements, and implementations of the invention in the form of methods, apparatuses, systems, recording mediums and computer programs may also be practiced as additional modes of the present invention.

Advantage of the Present Invention

According to the invention, nonlinear distortion in a reproduction signal resulting from improvement in the recording density or variation in the recording power can be reduced without using a training signal.

BRIEF DESCRIPTION OF THE DRAWINGS

FIG. 21 shows the data structure of a table stored in the identifier unit of FIG. 16;

BEST MODE FOR CARRYING OUT THE INVENTION

First Embodiment

A summary of the present invention will be given before describing the invention in specific detail. The first embodiment of the present invention relates to a reproduction device adapted to reproduce a signal recorded on a recording medium such as an optical disk, equalizes the signal thus reproduced (hereinafter, referred to as "reproduction signal") according to the partial response method, and decodes the equalization signal. As described before, increase in the recording capacity of optical disks results in nonlinear distortion that cannot be removed by a linear waveform equalizer affecting a reproduction signal more severely. A neural network as a nonlinear equalizer is useful to remove nonlinear distortion. This will, however, require using a training signal for learning to take place and to converge an error. The reproduction device according to this embodiment executes the processes as described below in order to reduce nonlinear distortion of a reproduction signal without using a training signal.

The reproduction device is configured such that a linear waveform equalizer is provided in a stage preceding and in series with a nonlinear waveform equalizer. The reproduction device is also configured such that an equalization signal from the linear waveform equalizer (hereinafter, referred to as "linear equalization signal") is fed to the nonlinear waveform equalizer and an equalization signal from the nonlinear waveform equalizer (hereinafter, referred to as "nonlinear equalization signal") is then fed to a Viterbi decoder. The linear equalization signal is also fed to a temporary decision unit and subject to temporary decision by the temporary decision unit. The signal subjected to temporary decision (hereinafter, referred to as "temporary decision signal") is fed to the linear waveform equalizer and the nonlinear waveform equalizer as a teacher signal. The linear waveform equalizer and the nonlinear waveform equalizer derive tap coefficients based on the teacher signal and perform an equalization process.

The nonlinear waveform equalizer may comprise, for example, a neutral network. However, the configuration described above allows learning in the neural network to take place without using a training signal. The linear waveform equalizer and the nonlinear waveform equalizer require the use of the linear equalization signal, the nonlinear equalization signal, and the temporary decision signal to derive tap coefficients. However, the linear equalization signal, the nonlinear equalization signal, and the temporary decision signal differ from each other in the output timing. In order to align the timing, the reproduction device is configured to delay the linear equalization signal and the nonlinear equalization signal before deriving tap coefficients.

Figure 1:
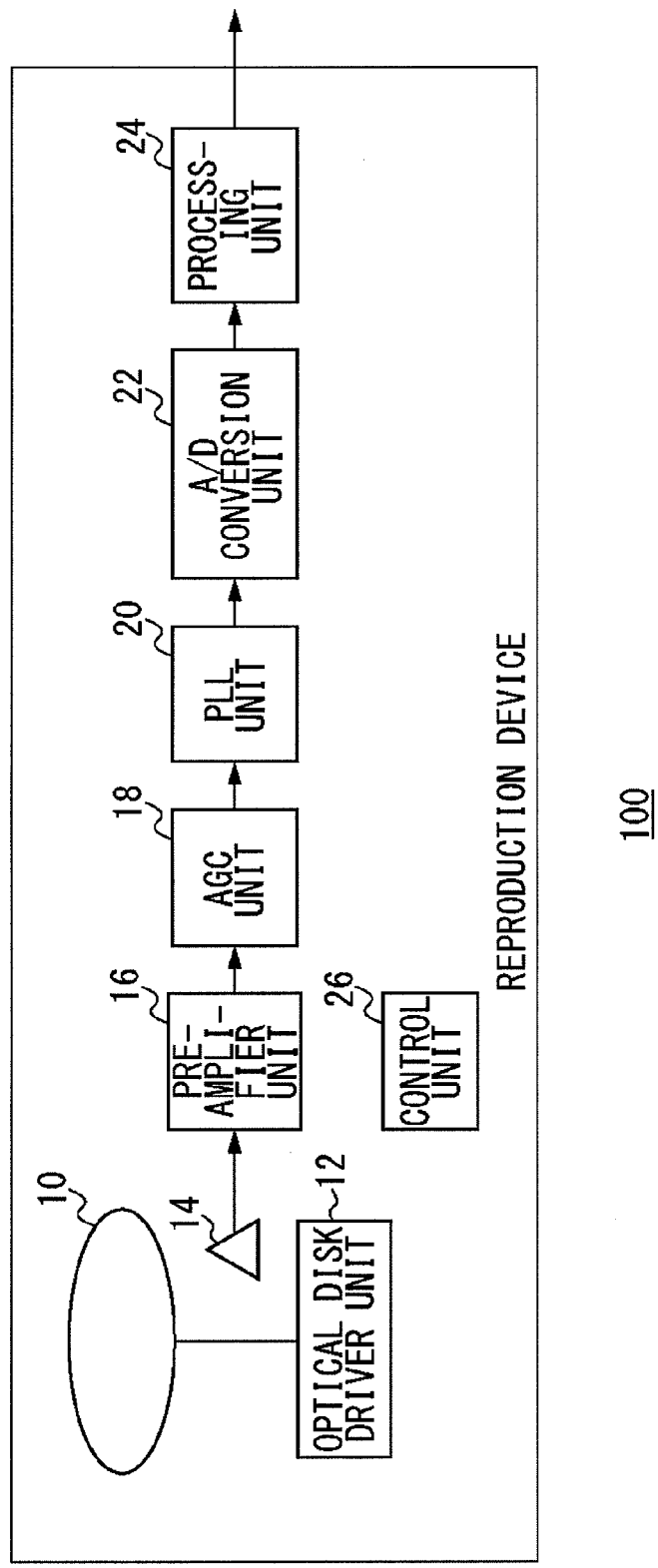
FIG. 1 shows the configuration of a reproduction device according to the first embodiment of the present invention.

FIG. 1 shows the configuration of a reproduction device 100 according to the first embodiment of the present invention. The reproduction device 100 includes an optical disk 10, an optical disk driver unit 12, an optical pickup 14, a preamplifier 16, an AGC unit 18, a phase locked loop (PLL) unit 20, an A/D converter unit 22, a processing unit 24, and a control unit 26.

The optical disk 10 is a recording medium configured to be detachable from the reproduction device 100. The optical disk 10 may be any of various types of medium including CD, DVD, BD, HD, and HD DVD. The discussion here concerns an optical disk 10 in which nonlinear distortion is large enough to affect reproduction. The optical disk driver unit 12 is a motor for rotating the optical disk 10 at a predetermined rotation speed. The optical pickup 14 reads a signal subject to processing from the optical disk 10 and subjects the read signal to photoelectric conversion and amplification. The resultant signal represents the "reproduction signal". The optical pick 14 outputs the reproduction signal to the preamplifier unit 16.

The preamplifier unit 16 amplifies the reproduction signal and the AGC unit 18 amplifies the reproduction signal from the preamplifier unit 16 to a predetermined amplitude. The AGC unit 18 outputs the amplified reproduction signal to the PLL unit 20. The PLL unit 20 detects clocks from the reproduction signal. The A/D converter unit 22 subjects the reproduction signal to analog-to-digital conversion on the basis of the clocks detected by the PLL unit 20. The processing unit 24 performs an equalization process and a decoding process on the reproduction signal subjected to analog-to-digital conversion (hereinafter, also referred to as "reproduction signal") in the A/D converter unit 22. The detail of the processing unit 24 will be described later.

Figure 2:
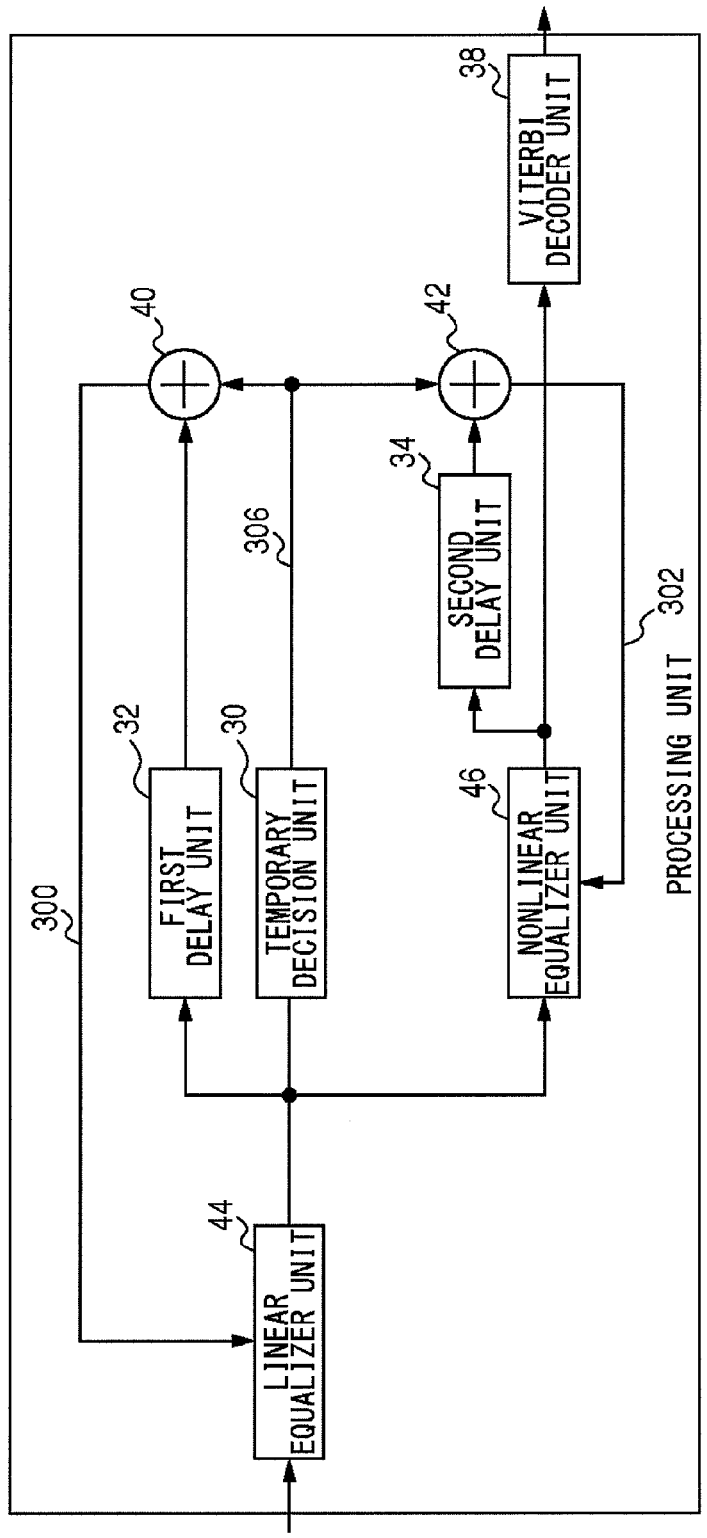
FIG. 2 shows the configuration of the processing unit of FIG. 1.

The configuration is implemented, in hardware, by any CPU of a computer, a memory, or other LSIs and, in software, by a program or the like loaded into the memory. FIG. 2 depicts functional blocks implemented by the cooperation of hardware and software. Therefore, it will be obvious to those skilled in the art that the functional blocks may be implemented in a variety of manners by hardware only, software only, or a combination of thereof.

FIG. 2 shows the configuration of the processing unit 24. The processing unit 24 comprises a linear equalizer unit 44, a first delay unit 32, a temporary decision unit 30, a nonlinear equalizer unit 46, a second delay unit 34, a first adder unit 40, a second adder unit 42, and a Viterbi decoding unit 38. The processing unit 24 also includes an error signal for linear equalization (linear equalization error signal) 300, an error signal for nonlinear equalization (nonlinear equalization error signal) 302, and a temporary decision signal 306.

The reproduction signal sampled according to bit clocks in the A/D converter unit 22 of FIG. 1 is sequentially input to the linear equalizer unit 44. The linear equalizer unit 44 sequentially subjects the input reproduction signal to linear equalization. The linear equalizer unit 44 comprises a transversal filter. The linear equalizer unit 44 delays the reproduction signal using a multistage tap, multiplies outputs from the multistage tap by a plurality of tap coefficients, and adds the multiplied results. The result of addition represents the linear equalization signal mentioned above. The linear equalizer unit 44 receives the linear equalization error signal 300 from the first adder unit 40 described later and derives a plurality of tap coefficients based on the linear equalization error signal 300. For derivation of the plurality of tap coefficients, an adaptive algorithm such as least mean square (LMS) algorithm is used. The linear equalizer unit 44 outputs the linear equalization signal to the first delay unit 32, the temporary decision unit 30, and the nonlinear equalizer unit 46.

The nonlinear equalizer unit 46 receives the linear equalization signal from the linear equalizer unit 44 and sequentially subjects the linear equalization signal to nonlinear equalization. The nonlinear equalizer unit 46 comprises a neutral network. The result of nonlinear equalization by the nonlinear equalizer unit 46 represents the aforementioned nonlinear equalization signal. The nonlinear equalizer unit 46 receives the nonlinear equalization error signal 302 from the second adder unit 42 described later and derives a plurality of tap coefficients used in the neural network based on the nonlinear equalization error signal 302. Since the nonlinear equalization error signal 302 is created based on the difference between the delayed signal from the second delay unit 34 and the temporary decision signal 306, it can be said that the nonlinear equalizer unit 46 derives the plurality of coefficients using the temporary decision signal as a teacher signal. The nonlinear equalizer unit 46 outputs the nonlinear equalization signal to the second delay unit 34 and the Viterbi decoding unit 38.

The Viterbi decoding unit 38 receives the nonlinear equalization signal from the linear equalizer unit 46 and subjects the nonlinear equalization signal to Viterbi decoding. The Viterbi decoding unit 38 includes a branch metric operation circuit configured to compute a branch metric from the nonlinear equalization signal, a path metric operation circuit configured to compute a path metric by cumulatively adding branch metrics clock by clock, and a path memory configured to select and store a data sequence giving the smallest path metric as the most likely candidate sequence. The path memory stores a plurality of candidate sequences and selects the candidate sequence in accordance with a selection signal from the path metric operation circuit. The selected candidate sequence is output as a data sequence.

The temporary decision unit 30 receives the linear equalization signal from the linear equalizer unit 44 and sequentially performs temporary decision on the linear equalization signal by subjecting the linear equalization signal to Viterbi decoding. The temporary decision unit 30 is configured in the same way as the Viterbi decoding unit 38. The path memory stores a plurality of candidate sequences and performs temporary decision according to a partial response rule by referring to a selection signal from the path metric operation circuit. More specifically, the temporary decision unit 30 temporarily decides the level of an output in response to predetermined input bits occurring when partial response equalization is performed normally, and outputs the temporarily decided level in response to the input bits as the temporary decision signal 306. The memory length of the temporary decision unit 30 is configured to be different from that of the Viterbi decoding unit 38. For example, if the path memory length of the Viterbi decoding unit 38 is 64 bits, the path memory length of the temporary decision unit 30 is 24 bits or 32 bits.

The first delay unit 32 receives the linear equalization signal from the linear equalizer unit 44. After delaying the linear equalization signal, the first delay unit 32 outputs the delayed linear equalization signal (hereinafter, referred to as "linear equalization signal" or "delayed signal") to the first adder unit 40. The first delay unit 32 delays the signal for a duration commensurate with the processing delay in the temporary decision unit 30. In other words, the timing of the temporary decision signal 306 output from the temporary decision unit 30 and the timing of the linear equalization signal from the linear equalizer unit 44 are aligned in the first adder unit 40. The first delay unit 32 comprises a latch circuit driven by bit clocks. The first adder unit 40 receives the linear equalization signal from the first delay unit 32 and the temporary decision signal 306. The first adder unit 40 generates the linear equalization error signal 300 based on the difference between the linear equalization error and the temporary decision signal 306. For example, the linear equalization error signal 300 is derived by subtracting the temporary decision signal 306 from the linear equalization error. The first adder unit 40 outputs the linear equalization error signal 300 to the linear equalizer unit 44.

The second delay unit 34 receives the nonlinear equalization signal from the nonlinear equalizer unit 46. After delaying the nonlinear equalization signal, the second delay unit 34 outputs the delayed nonlinear equalization signal (hereinafter, referred to as "nonlinear equalization signal" or "delayed signal") to the second adder unit 42. The second delay unit 34 delays the signal for a duration commensurate with the difference between the processing delay in the temporary decision unit 30 and the processing delay in the nonlinear equalizer unit 46. The second adder unit 42 generates the nonlinear equalization error signal 302 based on the difference between the nonlinear equalization signal from the second delay unit 34 and the temporary decision signal 306. For example, the nonlinear equalization error signal 302 is derived by subtracting the temporary decision signal 306 from sum of nonlinear equalization errors. The second adder unit 42 outputs the nonlinear equalization error signal 302 to the nonlinear equalizer unit 46.

The nonlinear equalizer unit 46 derives a plurality of coefficients based on the nonlinear equalization error signal 302. In other words, the nonlinear equalizer unit 46 uses the temporary decision signal 306 as a teacher signal. The nonlinear equalizer unit 46 monitors convergence of the plurality of tap coefficients in the nonlinear equalizer unit 46 by computing an integrated value, which is a sum obtained by sequentially adding square values of the nonlinear equalization error signal 302. In other words, the nonlinear equalizer unit 46 determines that the plurality of tap coefficients converge when the integrated value of the nonlinear equalization error signal 302 drops below a threshold value. When the integrated value, which is a sum of square values of the nonlinear equalization error signal 302, grows larger than the threshold value again subsequent to the determination of convergence, the nonlinear equalizer unit 46 determines that the plurality of tap coefficients of the nonlinear equalizer unit 46 diverge. In this process, the nonlinear equalizer unit 46 derives new tap coefficients.

Figure 3:
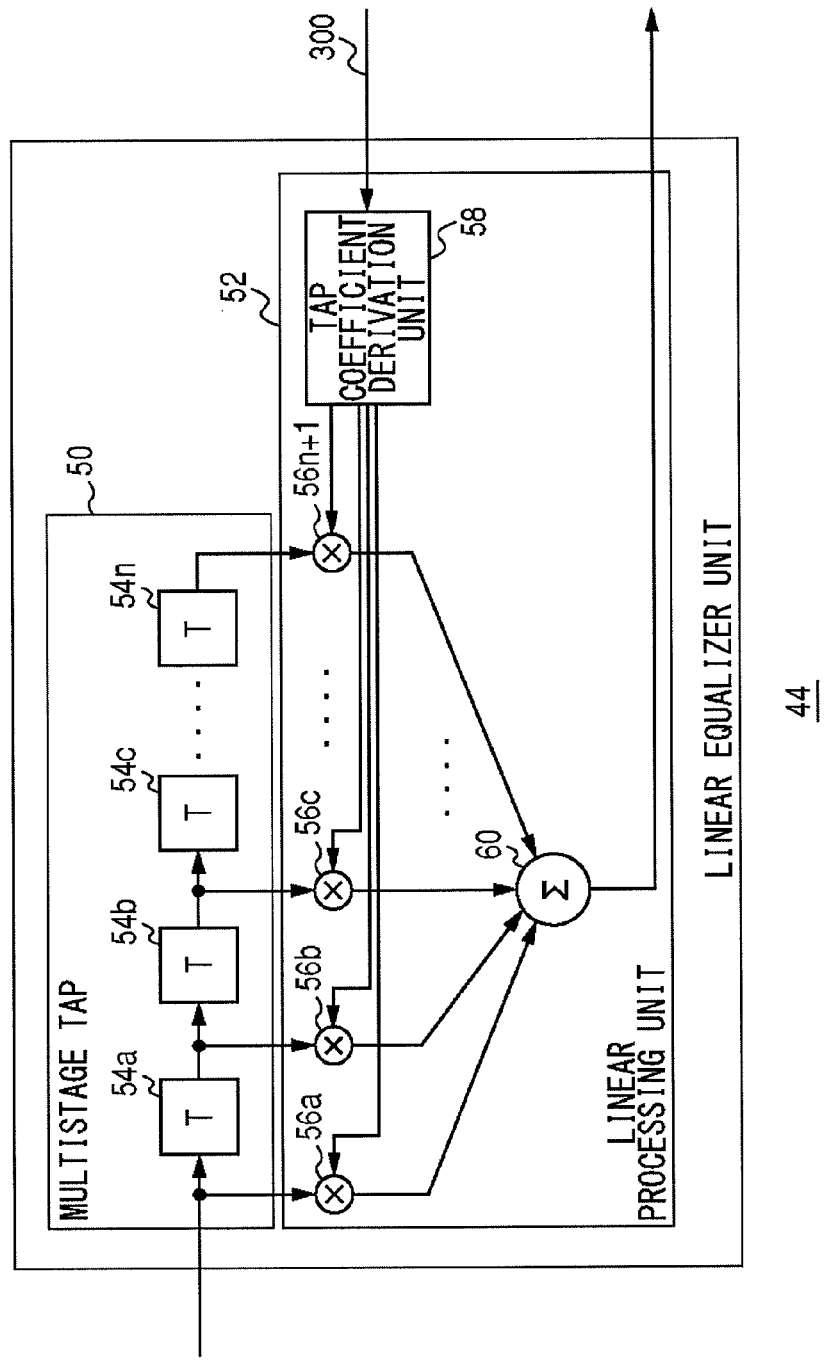
FIG. 3 shows the configuration of the linear equalizer unit of FIG. 2.

FIG. 3 shows the configuration of the linear equalizer unit 44. The linear equalizer unit 44 includes a multistage tap 50 and a linear processing unit 52. The multistage tap 50 includes a first delay tap 54*a*, a second delay tap 54*b*, a third delay tap 54*c*, and an N-th delay tap 54*n*, which are generically referred to as a delay tap 54. The linear processing unit 52 includes a first multiplier unit 56*a*, a second multiplier unit 56*b*, a third multiplier unit 56*c*, and an N+1 multiplier unit 56*n*+1, which are generically referred to as multiplier units 56, a tap coefficient derivation unit 58, and an integration unit 60.

The multistage tap 50 is formed by connecting a plurality of delay taps 54 serially. More specifically, the first delay tap 54a receives the reproduction signal, delays the signal, and outputs the reproduction signal again. The second delay tap 54b receives the reproduction signal from the first delay tap 54a, delays the signal, and outputs the reproduction signal. The third through N-th delay taps 54c-54n perform the same process. The input to the delay tap 54 and the output therefrom provide output signals from the multistage tap 50. For example, when four delay taps 54 are provided, there are five output signals. These output signals are output to the multiplier unit 56.

The multiplier unit 56 receives an output signal from the delay tap 54 and also receives the tap coefficient from the tap coefficient derivation unit 58. The tap coefficient is derived in association with the corresponding output signal. The multiplier unit 56 multiplies the output signal by the tap coefficient. The multiplier unit 56 outputs the result of multiplication to the integration unit 60. The integration unit 60 determines an integrated value, which is a result of sequentially adding the results of multiplication from the multiplier unit 56. The integrated value resulting from the addition represents the linear equalization signal mentioned before. The integration unit 60 outputs the linear equalization signal. The tap coefficient derivation unit 58 receives the linear equalization error signal 300. The tap coefficient derivation unit 58 uses the linear equalization error signal 300 and the results of multiplication in the multiplier unit 56 to control the plurality of tap coefficients such that the reproduction signal matches the partial response characteristics. By using an adaptive algorithm such as the LMS algorithm to derive tap coefficients, the linear equalization error signal 300 is controlled to be small. The LMS algorithm is a publicly known technology and the description thereof is omitted.

Figure 4:
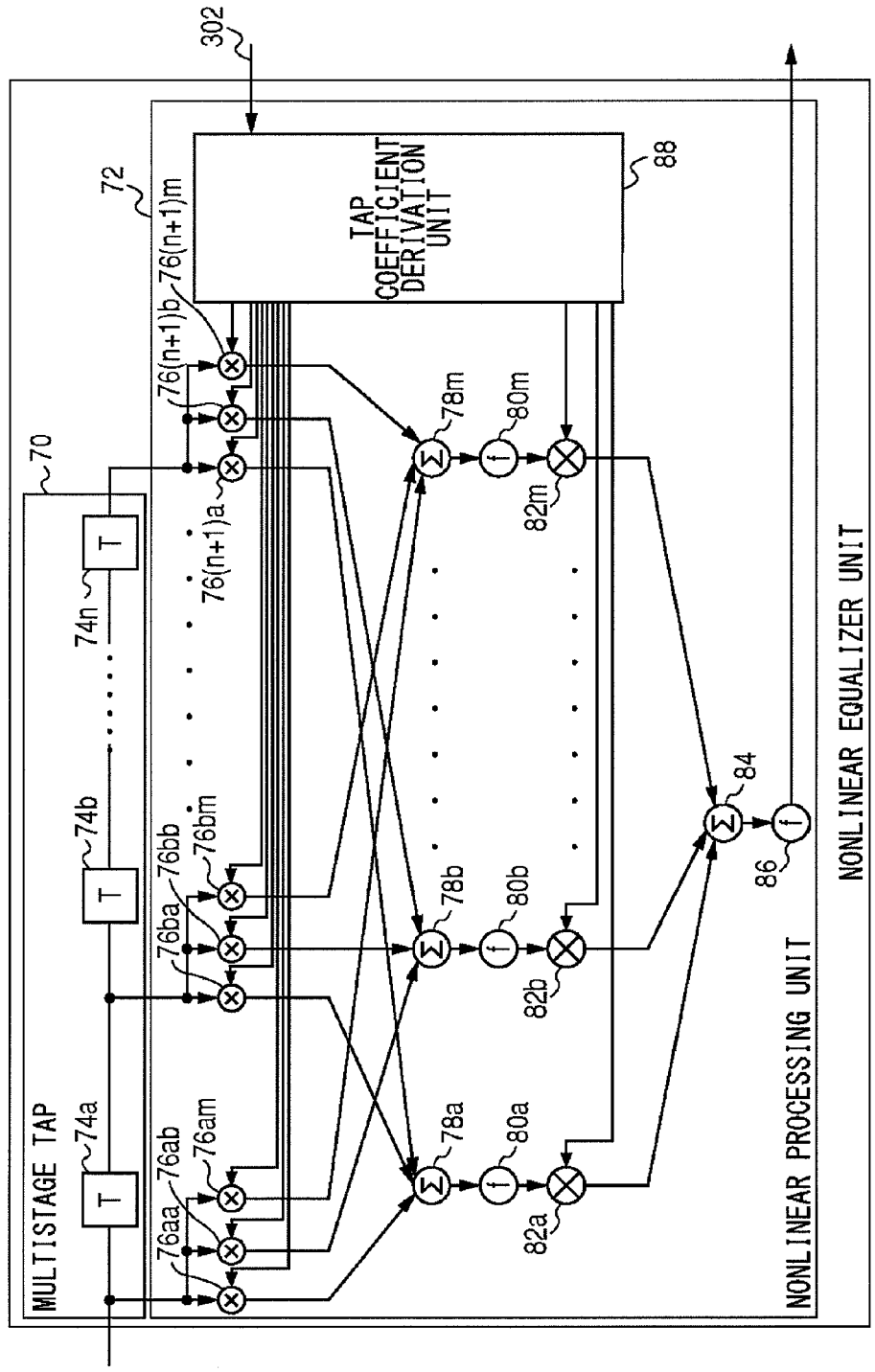
FIG. 4 shows the configuration of the nonlinear equalizer unit of FIG. 2.

FIG. 4 shows the configuration of the nonlinear equalizer unit 46. The nonlinear equalizer unit 46 includes a multistage tap 70 and a nonlinear processing unit 72. The multistage tap 70 includes a first delay tap 74a, a second delay tap 74b, and an N-th delay tap 74n, which are generically referred to as a delay tap 74. The nonlinear processing unit 72 includes an 11-th multiplier unit 76aa, a 12-th multiplier unit 76ab, a 1M-th multiplier unit 76am, a 21-th multiplier unit 76ba, a 22-th multiplier unit 76bb, a 2M-th multiplier unit 76bm, an (N+1)1-th multiplier unit 76(n+1)a, a (N+1)2-th multiplier unit 76(n+1)b, an (N+1)M-th multiplier unit 76(n+1)m, which are generically referred to as a multiplier unit 76, a first integration unit 78a, a second integration unit 78b, an M-th integration unit 78m, which are generically referred to as an integration unit 78, a first function operation unit 80a, a second function operation unit 80b, an M-th functional operation unit 80m, which are generically referred to as a function operation unit 80, a first multiplier unit 82a, a second multiplier unit 82b, an M-th multiplier unit 82m, which are generically referred to as a multiplier unit 82, an integration unit 84, a function operation unit 86, and a tap coefficient derivation unit 88.

The nonlinear equalizer unit 46 is configured as a three-layer perceptron neural network as illustrated. The input layer represents the multistage tap 70, the hidden layer represents the function operation unit 80, and the output layer represents the function operation unit 86. The multistage tap 70 is formed by connecting a plurality of delay taps 74 serially. More specifically, the first delay tap 74a receives the linear equalization signal, delays the signal, and outputs the linear equalization signal. The second delay tap 74b receives the linear equalization signal from the first delay tap 74a, and outputs the linear equalization signal. The N-th delay tap 74n performs a similar process. The input to the delay tap 74 and the output therefrom provide output signals from the multistage tap 70. These output signals are output to the multiplier 76.

The multiplier 76 multiplies the output signal from the multistage tap 70 by the tap coefficient from the tap coefficient derivation unit 88. More specifically, the IJ-th multiplier unit 76ij generates a result of multiplication U(i,j) by multiplying the i-th output signal S(i) from the start of the multistage tap 70 by the tap coefficient W1(i,j). The integration unit 78 performs integration by sequentially adding the results of multiplication by the multiplier units 76. To describe it in more specific terms, the J-th integration unit 78j generates an integration result V(j) by cumulatively adding the multiplication results U(1,j), U(2,j), U(3,j), . . . U(n+1,j). The function operation unit 80 substitutes the integration result V(j) in the integration unit 78 into a sigmoid function. The sigmoid function is given as follows.

$$f(x)=(1-\exp(-\alpha x))/(1+\exp(-\alpha x))$$ (expression 1)

The integration result V(j) is substituted into x of expression 1. The result of operation in the J-th function operation unit 80j is denoted by X(j), which represents the output from the hidden layer.

The multiplier 82 multiplies the result of operation in the function operation unit 80 by the tap coefficient from the tap coefficient derivation unit 88. To describe it in more specific terms, the J-th multiplier unit 82j generates the result of operation Y(j) by multiplying the result of operation X(j) in the J-th function operation unit 80j by the tap coefficient W2(j). The integration unit 84 performs integration by sequentially adding the results of multiplication in the multiplier units 82. The results of multiplication in all multiplier units 82 are integrated to generate a result of integration Z. The function operation unit 86 substitutes the result of integration in the integration unit 84 into a sigmoid function. In this case, the integration result Z is substituted into x of expression 1. The result of operation in the function operation unit 86 represents the output from the output layer and the nonlinear equalization signal mentioned above.

The tap coefficient derivation unit 88 derives the tap coefficients W1(i,j) and W2(j) used in the multiplier units 76 and the multiplier units 82, respectively. A random value or a value close convergence is defined as an initial value of W1(i,j) and W2(j). Like the tap derivation unit 58 of FIG. 3, the tap coefficient derivation unit 88 updates W1(i,j) and W2(j) using the LMS algorithm. W1(i,j) and W2(j) are learned by back propagation. The square value of the nonlinear equalization error signal 302 is given as follows.

$$E=(A-D)^2$$ (expression 2)

where A denotes the linear equalization signal and D denotes the temporary decision signal 306. In other words, A−D represents the nonlinear equalization error signal 302. The tap coefficient derivation unit 88 controls W1(i,j) and W2(j) so that E is minimized. The result of back propagation in the output layer is given as follows.

$$(\partial E)/(\partial Y(j))=f'(Y(j))\times 2(A-D)$$ (expression 3)

The tap coefficient derivation unit 88 updates the tap coefficient W2(j) as follows.

$$W2(j)=W2(j)_{old}-\epsilon\times(\partial E)/(\partial W2(j))$$ (expression 4).

where W2(j)$_{old}$ denotes the tap coefficient W2(j) occurring at the immediately preceding point of time. Meanwhile, back propagation in the hidden layer is given as follows.

$$(\partial E)/(\partial U(i,j)) = f'(U(i,j)) \times (\partial E)/(\partial Y(j)) \times W2(j) \quad \text{(expression 5)}$$

The tap coefficient derivation unit 88 updates the tap coefficient $W1(i,j)$ as follows.

$$W1(i,j) = W1(i,j)_{old} - \epsilon \times (\partial E)/(\partial W1(i,j)) \quad \text{(expression 6)}$$

where $W1(i,j)_{old}$ denotes the tap coefficient $W1(i,j)$ occurring at the immediately preceding point of time.

Figure 5:
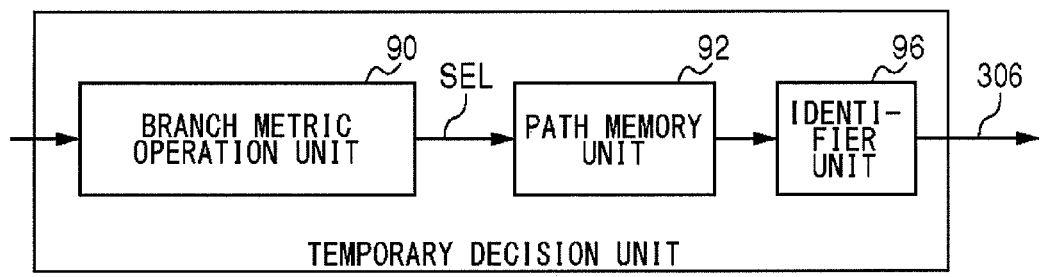
FIG. 5 shows the configuration of the temporary decision unit of FIG. 2.

FIG. 5 shows the configuration of the temporary decision unit 30. The temporary decision unit 30 includes a branch metric operation unit 90, a path memory unit 92, and an identifier unit 96. The temporary decision unit 30 also includes a selection signal SEL. The branch metric operation unit 90 performs branch metric operation and path metric operation based on the linear equalization signal from the linear equalizer unit 44 (not shown). For this purpose, the branch metric operation unit 90 includes the branch metric operation circuit and the path metric operation circuit mentioned above. As mentioned above, the embodiment uses the partial response method. Before describing the configuration of the temporary decision unit 30, state transition according to the partial response method will be described.

Figure 6:
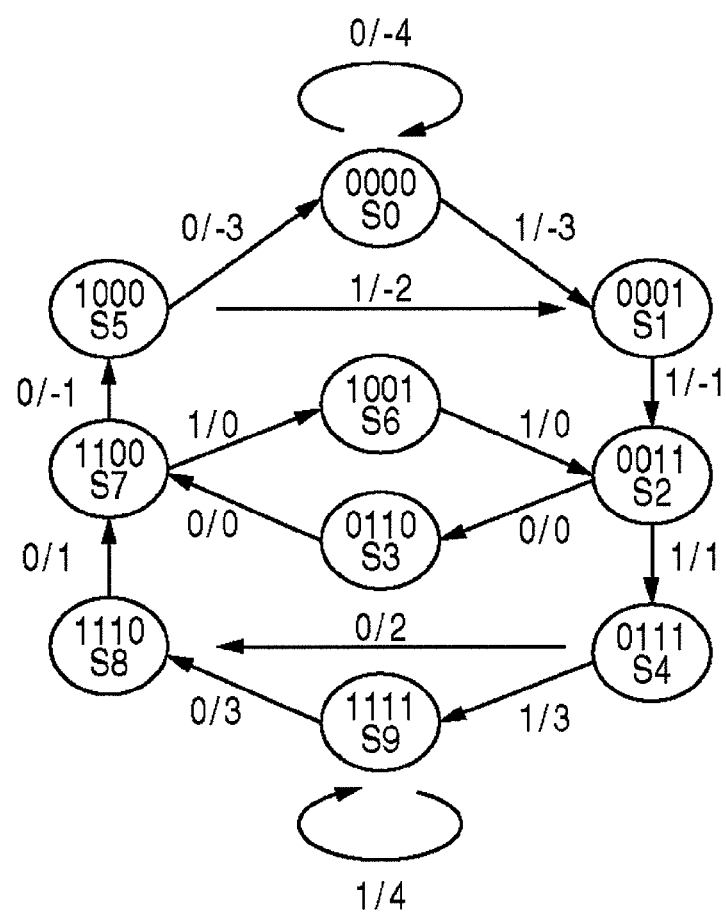
FIG. 6 shows state transition occurring when the temporary decision unit of FIG. 5 is compatible with a partial response (1,2,2,2,1)
Figure 7:
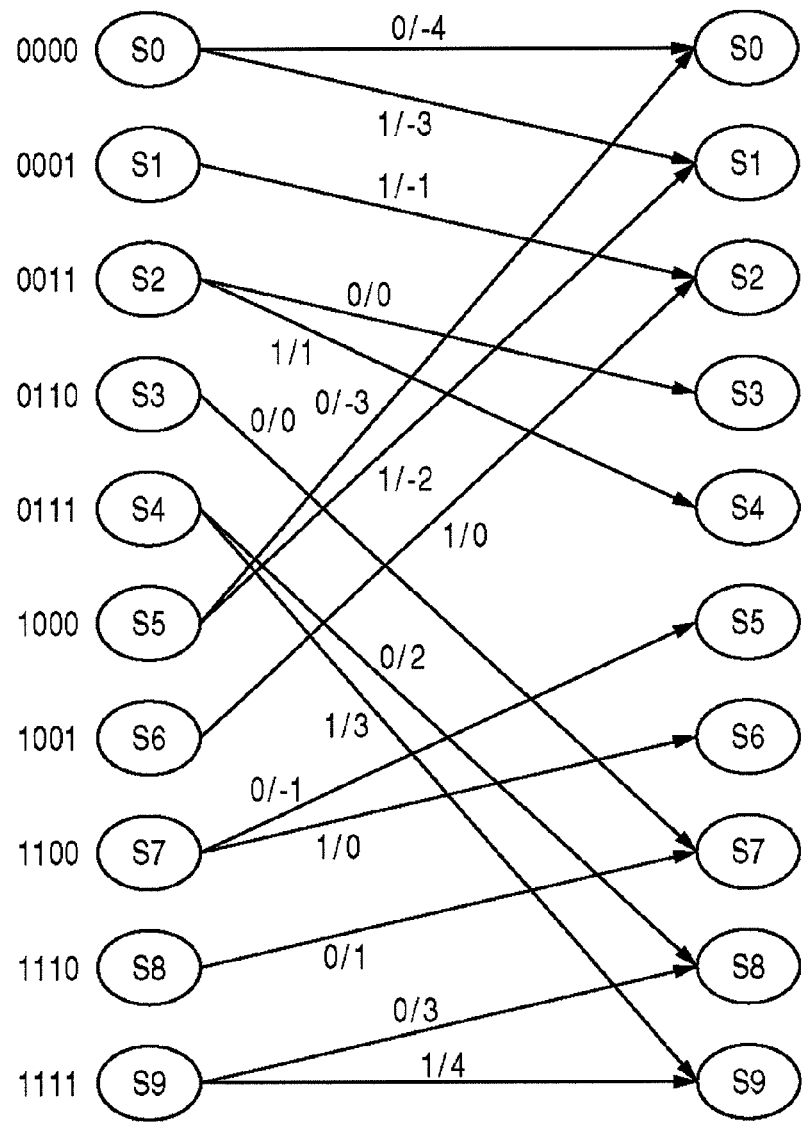
FIG. 7 also shows another state transition occurring when the temporary decision unit of FIG. 5 is comparable with a partial response (1,2,2,2,1)

FIG. 6 shows state transition occurring when the temporary decision unit 30 is compatible with a partial response (1,2,2,2,1). In the partial response (1,2,2,2,1), the amplitude is accommodated within the range of ±4. Given that four bits form a single combination, ten states from S0 to S9 are defined in accordance with the value included in the combination. The state makes a transition as illustrated depending on the bit value subsequently input. For example, when the bit value "1" is input in the state S0, transition to the state S1 takes place. The figure shows values in the format "x/y" adjacent to the arrows, where x denotes an input bit value and y denotes a temporary decision value in response to the 5 bits including a new bit value added to the original state. FIG. 7 shows state transition occurring when the temporary decision unit 30 is compatible with a partial response (1,2,2,2,1). FIG. 7 shows states occurring at two successive points of time, where each state is the same as the state shown in FIG. 6.

Figure 8:
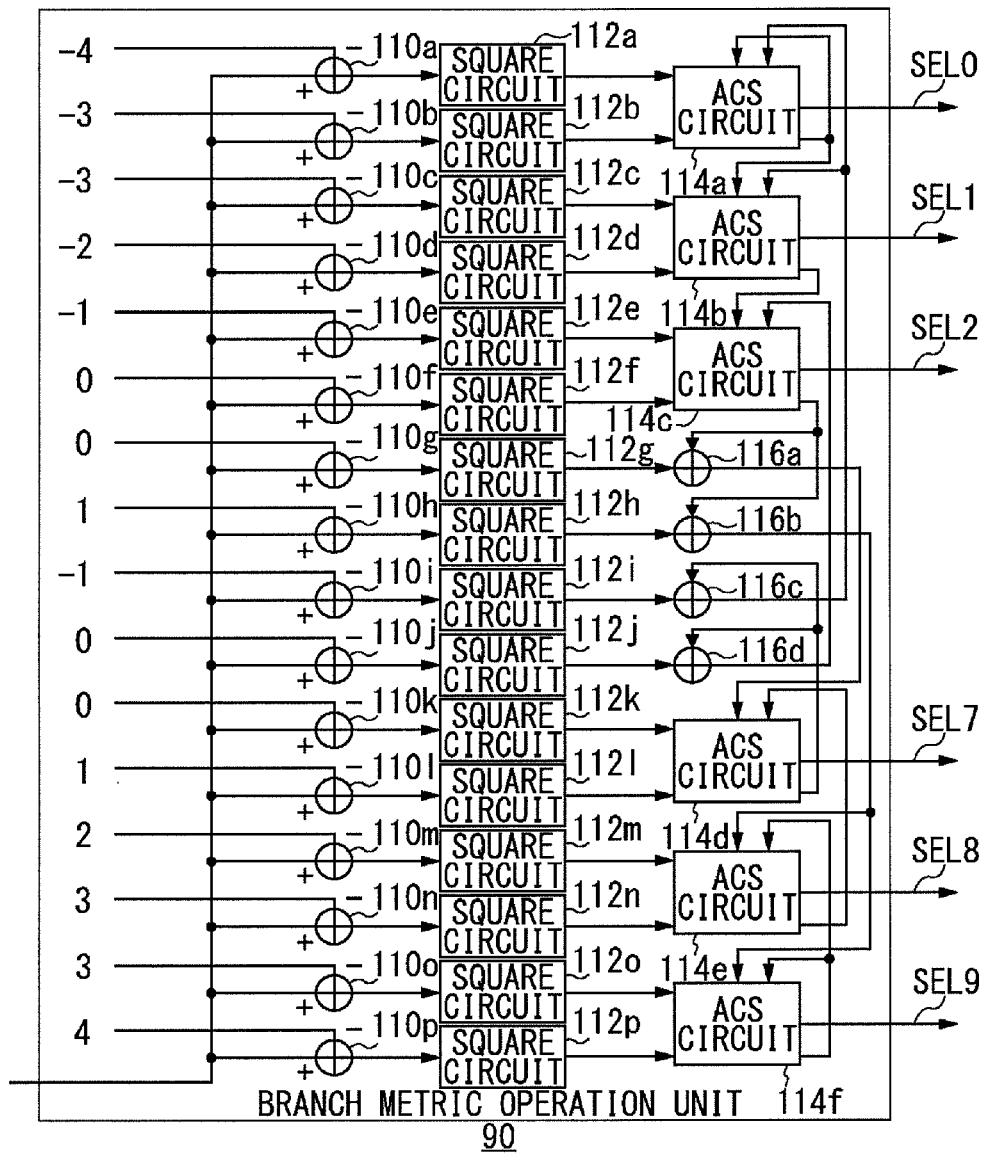
FIG. 8 shows the configuration of the branch metric operation unit of FIG. 5.

FIG. 8 shows the configuration of the branch metric operation unit 90. The branch metric operation unit 90 includes a first adder unit 110*a*, a second adder unit 110*b*, a third adder unit 110*c*, a fourth adder unit 110*d*, a fifth adder unit 110*e*, a sixth adder unit 110*f*, a seventh adder unit 110*g*, an eighth adder unit 110*h*, a ninth adder unit 110*i*, a tenth adder unit 110*j*, an eleventh adder unit 110*k*, a twelfth adder unit 110*l*, a thirteenth adder unit 110*m*, a fourteenth adder unit 110*n*, a fifteenth adder unit 110*o*, a sixteenth adder unit 110*p*, which are generically referred to as an adder unit 110, a first square circuit 112*a*, a second square circuit 112*b*, a third square circuit 112*c*, a fourth square circuit 112*d*, a fifth square circuit 112*e*, a sixth square circuit 112*f*, a seventh square circuit 112*g*, an eighth square circuit 112*h*, a ninth square circuit 112*i*, a tenth square circuit 112*j*, an eleventh square circuit 112*k*, a twelfth square circuit 112*l*, a thirteenth square circuit 112*m*, a fourteenth square circuit 112*n*, a fifteenth square circuit 112*o*, a sixteenth square circuit 112*p*, which are generically referred to as a square circuit 112, a first ACS circuit 114*a*, a second ACS circuit 114*b*, a third ACS circuit 114*c*, a fourth ACS circuit 114*d*, a fifth ACS circuit 114*e*, a sixth ACS circuit 114*f*, which are generically referred to as an ACS circuit 114, a first adder 116*a*, a second adder 116*b*, a third adder 116*c*, and a fourth adder 116*d*, which are generically referred to as an adder 116. The branch metric operation unit 90 also includes a 0-th selection signal SEL0, a first selection signal SEL1, a second selection signal SEL2, a seventh selection signal SEL7, an eighth selection signal SEL8, and a ninth selection signal SEL9, which are generically referred to as a selection signal SEL.

The adder unit 110 subtracts a predetermined target value from the linear equalization signal. The square circuit 112 computes a square of the result of subtraction in the adder unit 110. The ACS circuit 114 performs a metric operation by subjecting the square value from the square circuit 112 to addition, comparison, and selection. The ACS circuit 114 outputs a 0-th selection signal SEL0, a first selection signal SEL1, a second selection signal SEL2, a seventh selection signal SEL7, an eight selection signal SEL8, a ninth selection signal SEL9, as the result of metric operation. Some square values are not input to the ACS circuit 114 due to the partial response characteristics. Such square values are subject to addition in the adder unit 116. Reference is made back to FIG. 5.

Figure 9:
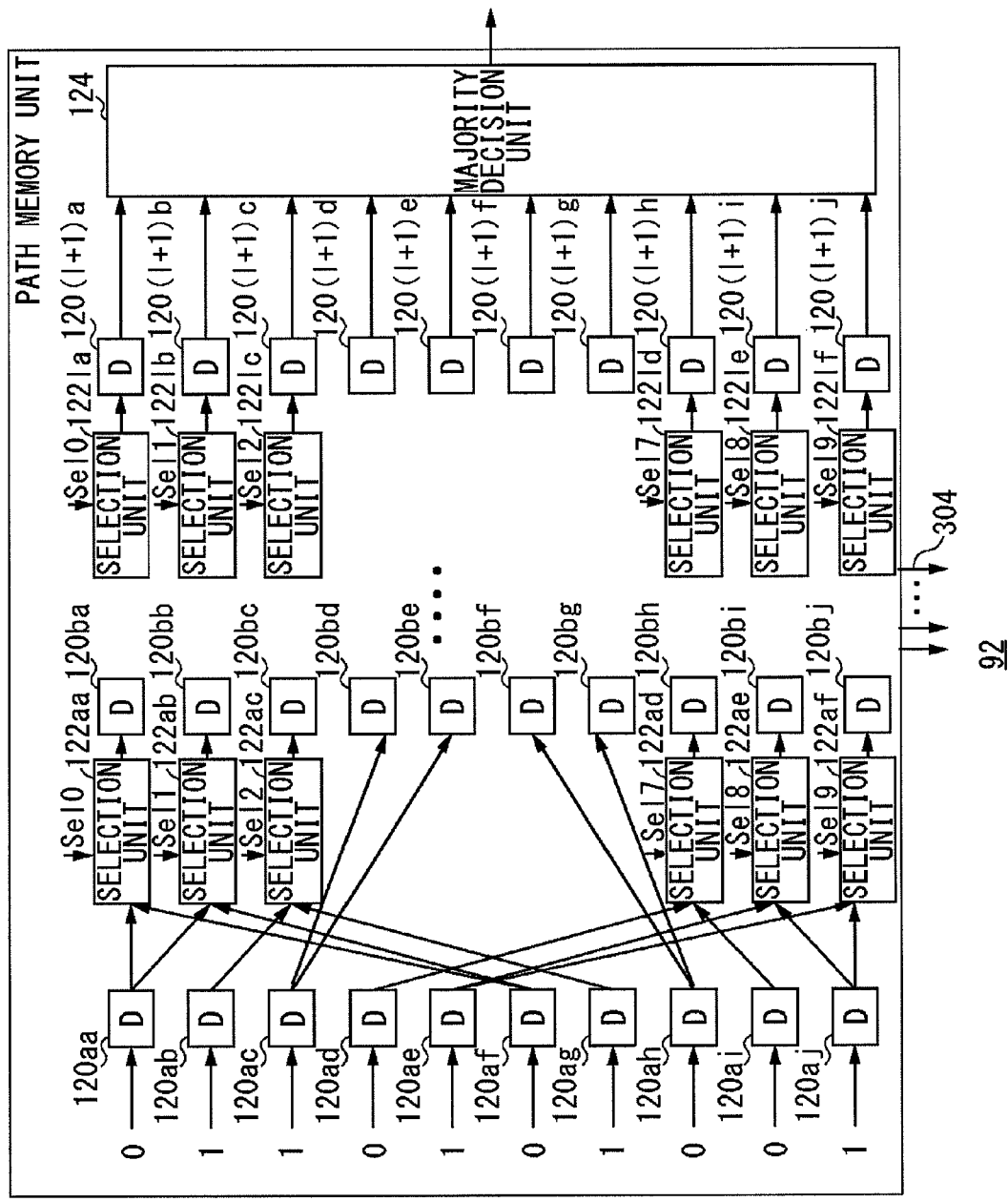
FIG. 9 shows the configuration of the path memory unit of FIG. 5.

The path memory unit 92 receives a selection signal SEL from the branch metric operation unit 90 and stores a path as determined by the selection signal SEL. FIG. 9 shows the configuration of the path memory unit 92. The path memory unit 92 includes an eleventh memory 120*aa*, a twelfth memory 120*ab*, a thirteenth memory 120*ac*, a fourteenth memory 120*ad*, a fifteenth memory 120*ae*, a sixteenth memory 120*af*, a seventeenth memory 120*ag*, an eighteenth memory 120*ah*, a nineteenth memory 120*ai*, a 110-th memory 120*aj*, a twenty first memory 120*ba*, a twenty second memory 120*bb*, a twenty third memory 120*bc*, a twenty fourth memory 120*bd*, a twenty fifth memory 120*be*, a twenty sixth memory 120*bf*, a twenty seventh memory 120*bg*, a twenty eighth memory 120*bh*, a twenty ninth memory 120*bi*, a 210-th memory 120*bj*, an (L+1)1-th memory 120(*l*+1)a, an (L+1)2-th memory 120(*l*+1)b, an (L+1)3-th memory 120(*l*+1)c, an (L+1)4-th memory 120(*l*+1)d, an (L+1)5-th memory 120(*l*+1)e, an (L+1)6-th memory 120(*l*+1)f, an (L+1)7-th memory 120(*l*+1)g, an (L+1)8-th memory 120(*l*+1)h, an (L+1)9-th memory 120(*l*+1)i, an (L+1)10-th memory 120(*l*+1)j, which are generically referred to as a memory 120, an eleventh selector unit 122*aa*, a twelfth selector unit 122*ab*, a thirteenth selector unit 122*ac*, a fourteenth selector unit 122*ad*, a fifteenth selector unit 122*ae*, a sixteenth selector unit 122*af*, an L1-th selector unit 1221*a*, an L2-th selector unit 1221*b*, an L3-th selector unit 1221*c*, an L4-th selector unit 1221*d*, an L5-th selector unit 1221*e*, an L6-th selector unit 1221*f*, which are generically referred to as a selector unit 122, and a majority decision unit 124.

A total of L+1 memories 120 store a single path and ten paths are stored in association with ten states shown in FIGS. 6 and 7. The selector unit 122 selects one of the paths in accordance with a selection signal SEL. The selected path represents a surviving path. The majority decision unit 124 receives the bit values stored in the (L+1)1-th memory 120(*l*+1)a through the (L+1)10-th memory 120(*l*+1)j and performs majority decision. The majority decision unit 124 outputs the result of selection. Reference is made back to FIG. 5.

The identifier unit 96 receives the selected value from the majority decision unit 124 (not shown) and stores the selected value in a latch. The identifier 96 selects a single combination from the selected values occurring at five points of time including those in the past. When a new selected value is input to the identifier unit 96, the selected value most remote in the past is removed from the combination, updating the combination.

Figure 10:
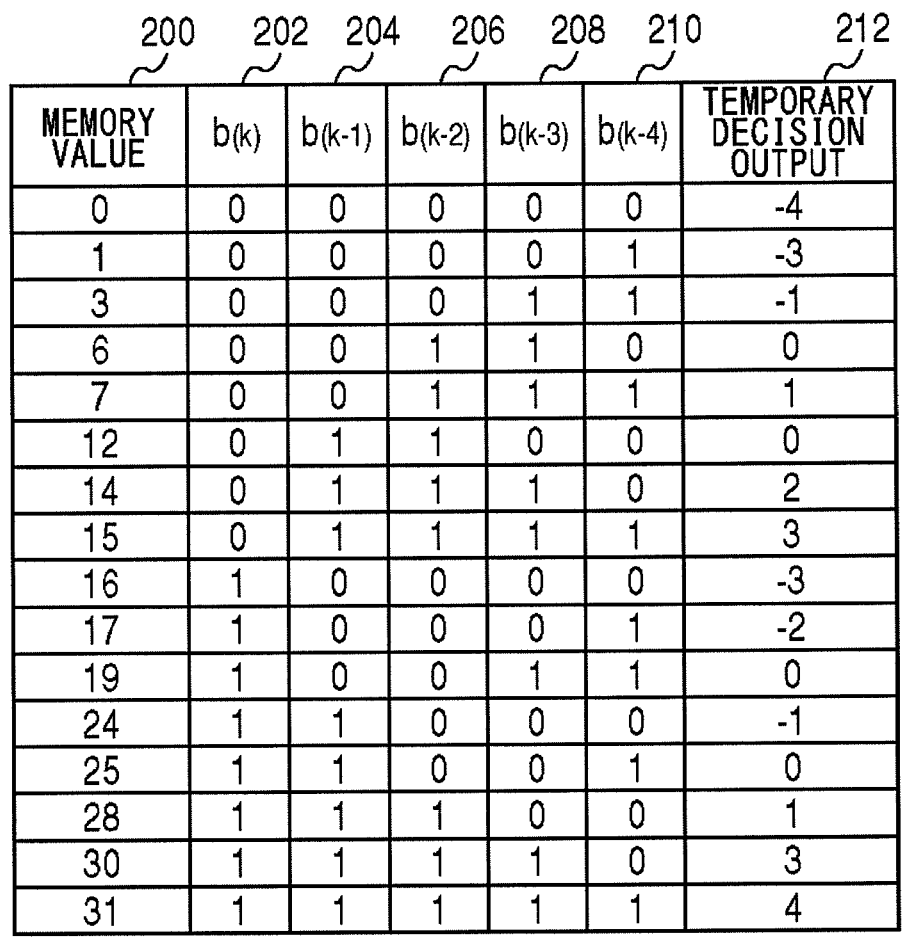
FIG. 10 shows the data structure of a table stored in the identifier unit of FIG. 5.

FIG. 10 shows the data structure of a table stored in the identifier unit 96. As illustrated, the table includes a memory value field 200, a b(k) field 202, a b(k−1) field 204, a b(k−2) field 206, a b(k−3) field 208, a b(k−4) field 210, and a temporary decision output field 212. b(k) represents the selected value most recently input, b(k−1) represents the selected value input at an immediately preceding point of time, b(k−4) represents the selected value input at a point of time four steps in the past. As mentioned before, the values are stored in a latch. The b(k) field 202 through the b(k−4) field 210 indicate a combination that the selected values stored in the latch may take. The memory value field 200 contains a memory value corresponding to the value that can be taken. The temporary decision output field 212 contains a temporary decision value corresponding to the value that can be taken. For example, given that the content of a path memory is "00000", a temporary decision value of "−4" is stored in the field 212. In the case of "00001", a temporary decision value of "−3" is stored. Reference is made back to FIG. 5. The identifier unit 96 identifies a temporary decision value corresponding to the combination by referring to the table shown in FIG. 10. The identifier unit 96 outputs the temporary decision value as the temporary decision signal 306.

Figure 11:
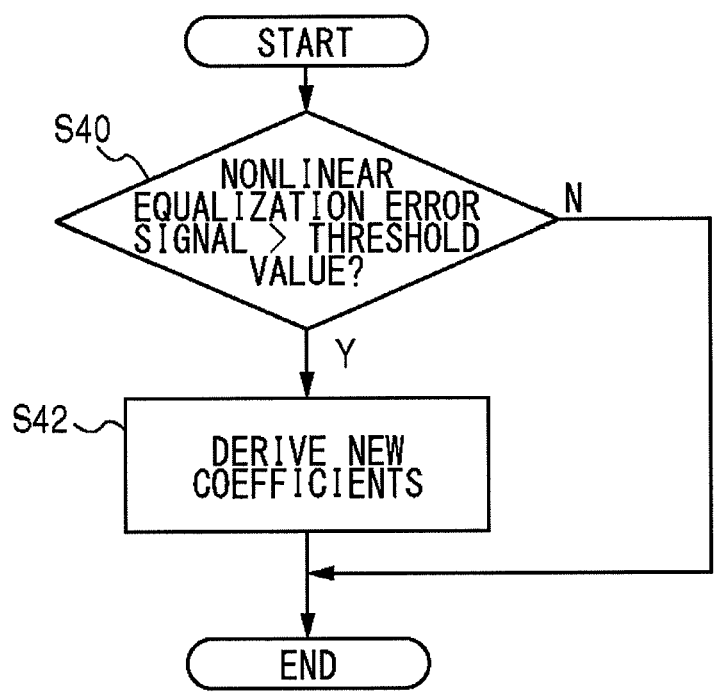
FIG. 11 is a flowchart showing the procedure of deriving coefficients in the nonlinear equalizer unit of FIG. 2.

A description will be given of the operation of the reproduction device 100 having the configuration described above. FIG. 11 is a flowchart showing the procedure of deriving coefficients in the nonlinear equalizer unit 46. Even after the magnitude of the nonlinear equalization error signal 302 has converged, the nonlinear equalizer unit 46 continues to derive the magnitude of the nonlinear equalization error signal 302. When the magnitude grows larger than the threshold value (Y in S40), the nonlinear equalizer unit 46 derives new tap coefficients (S42). When the magnitude does not grow larger than the threshold (N in S40), the process is terminated.

Figure 12B:
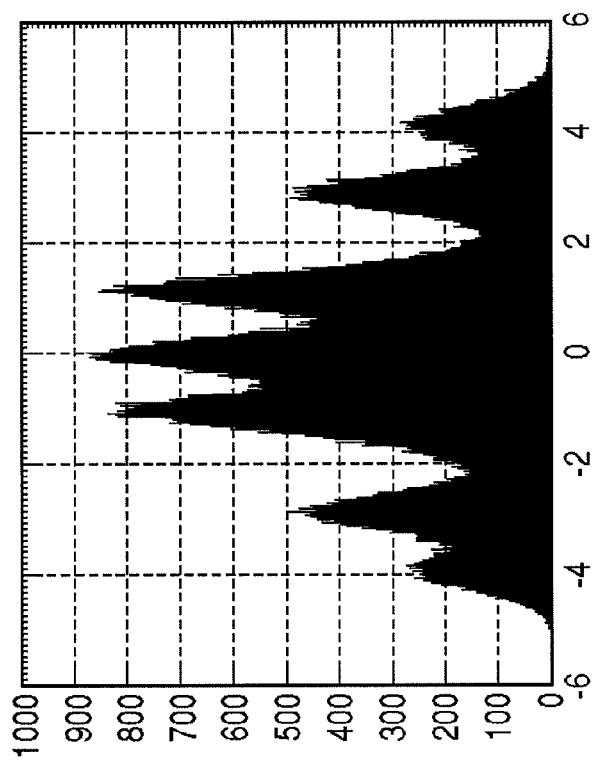
FIGS. 12A and 12B are histograms of the output signals from the related-art reproduction device and the reproduction device of FIG. 1, respectively.
Figure 12A:
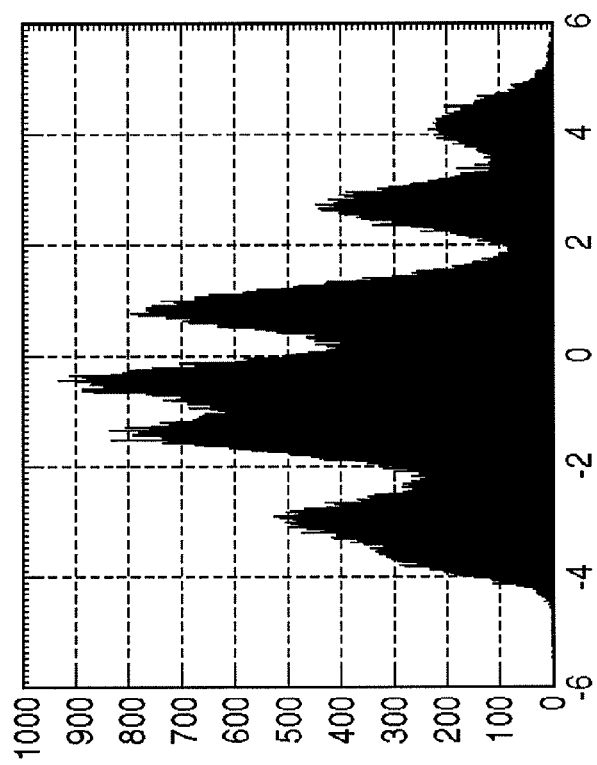

FIGS. 12A and 12B are histograms of the output signals from the related-art reproduction device and the reproduction device 100 of FIG. 1, respectively. FIG. 12A is a histogram of a signal equalized by the related-art linear waveform equalizer. The bit error rate in this case is $1.1 \times 10^{-2}$. Meanwhile, FIG. 12B is a histogram of a signal equalized by the reproduction device 100. As mentioned above, the target values are nine values in the partial response (1, 2, 2, 2, 1) characteristic. The bit error rate in this case is $1.5 \times 10^{-4}$. It is estimated that degradation in characteristics in related-art linear waveform equalizers is due to nonlinear components included in the waveform and the resultant failure to converge to Viterbi target values.

According to the embodiment of the present invention, the result of temporary decision of a linear equalization signal is used as a teacher signal so that a temporary decision signal can be used as a teacher signal instead of a training signal. Since a temporary decision is used as a teacher signal instead of a training signal, the coefficients for nonlinear equalization can be derived without using a training signal. Since the coefficients for nonlinear equalization can be derived without using a training signal, nonlinear equalization can be performed without using a training signal. Since the coefficients for nonlinear equalization can be derived without using a training signal, nonlinear distortion in the reproduction signal resulting from improvement in the recording density or variation in the recording power can be adaptively reduced without using a training signal.

Since temporary decision in compliance with the partial response rule is performed, the system is compatible with a partial response process. The signal is delayed for a duration commensurate with the difference between the processing delay in the temporary decision unit and the processing delay in the nonlinear equalizer unit. Therefore, the timing of the nonlinear equalization signal and the timing of the temporary decision signal can be aligned. Since the timing of the nonlinear equalization signal and the timing of the temporary decision signal are aligned, precision in estimating the tap coefficients for nonlinear equalization can be improved. Further, since a plurality of new coefficients are derived when divergence of the nonlinear equalization error signal is detected, degradation in the equalization characteristics is mitigated.

Second Embodiment

A summary of the present invention will be given before describing the invention in specific detail. The second embodiment of the present invention relates to a reproduction device adapted to reproduce a signal recorded on a recording medium such as an optical disk, equalizes the signal thus reproduced (hereinafter, referred to as "reproduction signal") according to the partial response method, and decodes the equalization signal. As described before, increase in the recording capacity of optical disks results in nonlinear distortion that cannot be removed by a linear waveform equalizer affecting a reproduction signal more severely. A neural network as a nonlinear equalizer is useful to remove nonlinear distortion. This will, however, require using a training signal for learning to take place and to converge an error. The reproduction device according to this embodiment executes the processes as described below in order to reduce nonlinear distortion of a reproduction signal without using a training signal.

The reproduction device is configured such that a linear waveform equalizer is provided parallel with a nonlinear waveform equalizer. A reproduction signal is supplied to both equalizers. The reproduction device is also configured such that an equalization signal from the linear waveform equalizer (hereinafter, referred to as "linear equalization signal") is synthesized with an equalization signal from the nonlinear waveform equalizer to produce a synthesized signal, and the synthesized signal (hereinafter, referred to as "sum signal") is then fed to a Viterbi decoder. The Viterbi decoder functions as a temporary decision unit of the present invention configured to sequentially subject the sum signal to temporary decision. The signal subjected to temporary decision by the Viterbi decoder (hereinafter, referred to as "temporary decision signal") is fed to the linear waveform equalizer and the nonlinear waveform equalizer as a teacher signal. The linear waveform equalizer and the nonlinear waveform equalizer derive tap coefficients based on the teacher signal and perform an equalization process. The nonlinear waveform equalizer may comprise, for example, a neutral network. Therefore, learning in the neural network takes place without using a training signal.

In order to achieve an adaptive operation using a combination of the linear waveform equalizer comprising a transversal filter and the nonlinear waveform equalizer comprising a neural network, the reproduction device further performs the following process. Generally, it takes a longer period of time for tap coefficients to converge in a nonlinear waveform equalizer than in a linear waveform equalizer. In order to prevent unstable operation prior to convergence in a neural network, the reproduction device monitors the situation of convergence of learning in the neural network. If convergence is not identified, the linear equalization signal is output to the Viterbi decoder instead of the sum signal. The linear waveform equalizer and the nonlinear waveform equalizer require the use of the linear equalization signal, the nonlinear equalization signal, and the temporary decision signal to derive tap coefficients. However, the linear equalization signal, the nonlinear equalization signal, and the temporary decision signal differ from each other in the output timing. In order to align the timing, the reproduction device is configured to delay the linear equalization signal and the nonlinear equalization signal.

An embodiment of the present invention will be described in the following.

Figure 13:
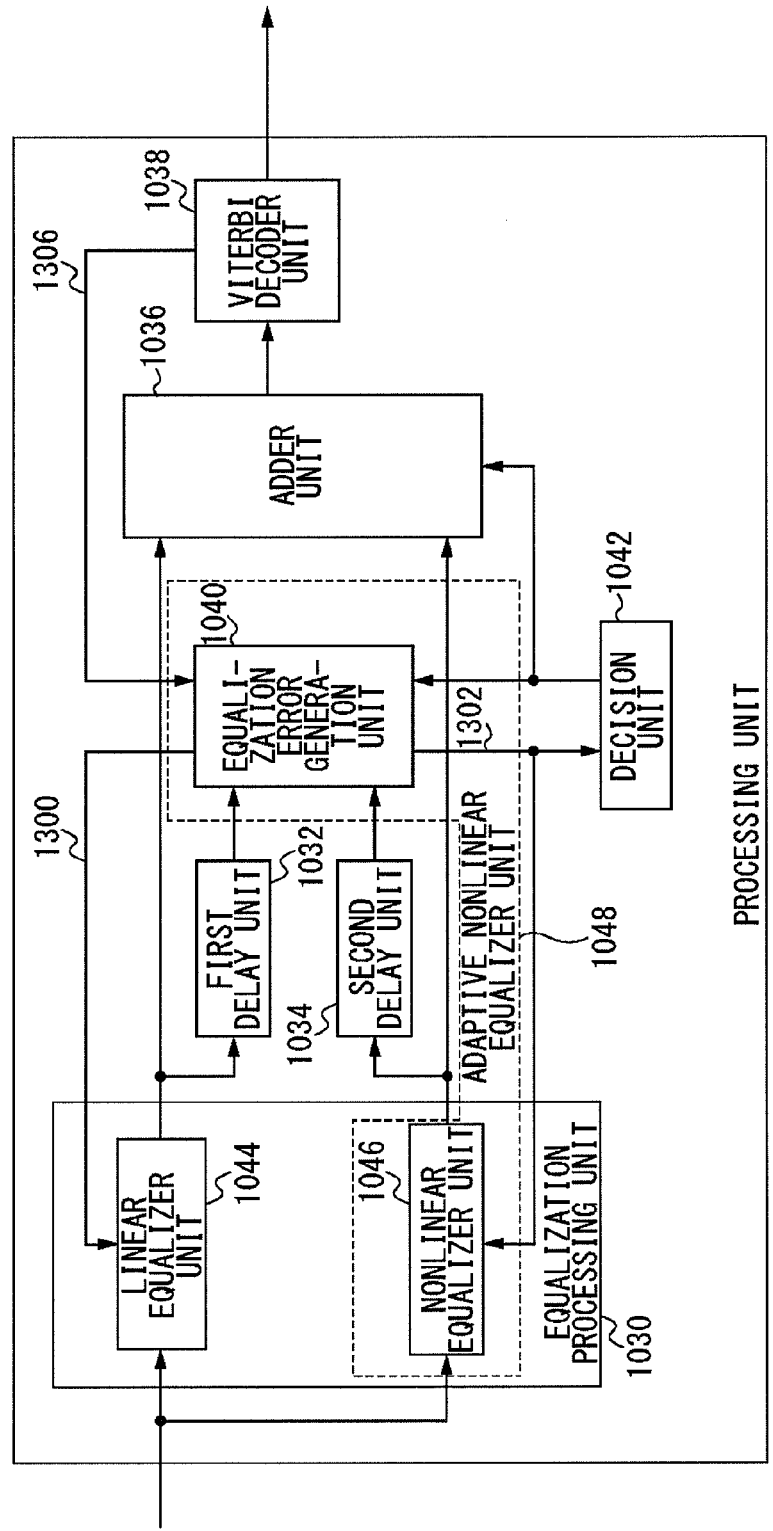
FIG. 13 shows the configuration of the processing unit according to the second embodiment of the present invention.

FIG. 13 shows the configuration of the processing unit 24. The processing unit 24 comprises an equalization processing unit 1030, a first delay unit 1032, a second delay unit 1034, an adder unit 1036, a Viterbi decoding unit 1038, an equalization error generation unit 1040, and a decision unit 1042. The equalization processing unit 1030 comprises a linear equalizer unit 1044 and a nonlinear equalizer unit 1046. The equalization error generation unit 1040 and the nonlinear equalizer unit 1046 are grouped into an adaptive nonlinear equalizer unit 1048. The processing unit 24 also includes an error signal for linear equalization (linear equalization error signal) 1300, an error signal for nonlinear equalization (nonlinear equalization error signal) 1302, and a temporary decision signal 1306. According to the embodiment of the present invention, the Viterbi decoder 1038 functions as a temporary decision unit according to the present invention configured to sequentially subject a signal produced by addition by the adder unit 1036 to temporary decision. Alternatively, a temporary decision unit may be provided separately from the Viterbi decoder unit 1038.

The reproduction signal sampled according to bit clocks in the A/D converter unit 22 of FIG. 1 is sequentially input to the linear equalizer unit 1044 and the nonlinear equalizer unit 1046. The linear equalizer unit 1044 sequentially subjects the input reproduction signal to linear equalization. The linear equalizer unit 1044 comprises a transversal filter. The linear equalizer unit 1044 delays the reproduction signal using a multistage tap, multiplies outputs from the multistage tap by a plurality of tap coefficients, and adds the multiplied results. The result of addition represents the linear equalization signal mentioned above. The linear equalizer unit 1044 receives the linear equalization error signal 1300 from the error signal generation unit 1040 described later and derives a plurality of tap coefficients based on the linear equalization error signal 300. For derivation of the plurality of tap coefficients, an adaptive algorithm such as least mean square (LMS) algorithm is used. The linear equalizer unit 1044 outputs the linear equalization signal to the equalization error generation unit 1044 via the first delay unit 1032.

The nonlinear equalizer unit 1046 sequentially subjects the reproduction signal to nonlinear equalization in parallel with linear equalization by the linear equalizer 1044. The nonlinear equalizer unit 1046 comprises a neutral network. The result of nonlinear equalization by the nonlinear equalizer unit 1046 represents the aforementioned nonlinear equalization signal. The nonlinear equalizer unit 1046 receives the nonlinear equalization error signal 1302 from the equalization error generation unit 1040 described later and derives a plurality of tap coefficients used in the neural network based on the nonlinear equalization error signal 1302. Since the nonlinear equalization error signal 1302 is created based on the difference between the temporary decision signal and a sum of the delayed signal from the first delay unit 1032 and the delayed signal from the second delay unit 1034, it can be said that the nonlinear equalizer unit 1046 derives the plurality of coefficients using the temporary decision signal as a teacher signal. The nonlinear equalizer unit 1046 outputs the nonlinear equalization signal to the equalization error generation unit 1040 via the second delay unit 1034 and also outputs the nonlinear equalized signal to the adder unit 1036 bypassing the second delay unit 1034.

The first delay unit 1032 receives the linear equalization signal from the linear equalizer unit 1044. After delaying the linear equalization signal, the first delay unit 1032 outputs the delayed linear equalization signal (hereinafter, referred to as "linear equalization signal" or "delayed signal") to the equalization error generation unit 1040. The first delay unit 1032 delays the signal for a duration commensurate with the processing delay in the Viterbi decoder unit 1038 required for temporary decision. In other words, the timing of the temporary decision signal 1306 reaching the Viterbi decoder unit 1038 from the linear equalizer unit 1044 and output from the Viterbi decoder unit 1038, and the timing of the linear equalization signal from the linear equalizer unit 1044 are aligned in the first delay unit 1032. The first delay unit 1032 comprises a latch circuit driven by bit clocks. The second delay unit 1034 receives the nonlinear equalization signal from the nonlinear equalizer unit 1046. After delaying the nonlinear equalization signal, the second delay unit 1034 outputs the delayed nonlinear equalization signal (hereinafter, referred to as "nonlinear equalization signal" or "delayed signal") to the equalizer error generation unit 1040. Like the first delay unit 1032, the second delay unit 1034 delays the signal for a duration commensurate with the processing delay in the Viterbi decoder unit 1038 required for temporary decision.

The adder unit 1036 receives the linear equalization signal from the linear equalizer unit 1044 and the nonlinear equalization signal from the nonlinear equalizer unit 1046. The adder unit 1036 produces the sum signal by adding the linear equalization signal and the nonlinear equalization signal. The adder unit 1036 outputs the sum signal to the Viterbi decoder unit 1038. The Viterbi decoding unit 1038 receives the sum signal from the linear adder unit 1036 and subjects the sum signal to Viterbi decoding. The Viterbi decoding unit 1038 includes a branch metric operation circuit configured to compute a branch metric from the sum signal, a path metric operation circuit configured to compute a path metric by cumulatively adding branch metrics clock by clock, and a path memory configured to select and store a data sequence giving the smallest path metric as the most likely candidate sequence. The path memory stores a plurality of candidate sequences and selects the candidate sequence in accordance with a selection signal from the path metric operation circuit. The selected candidate sequence is output as a data sequence.

The Viterbi decoder unit 1038 sequentially performs temporary decision on the sum signal by subjecting the data sequence stored in the path memory to temporary decision according to a partial response rule. In other words, the Viterbi decoder unit 1038 subjects one of the candidate sequences stored in the path memory to a temporary decision operation using a predetermined number of bits. More specifically, the Viterbi decoder unit 1038 temporarily decides the level of an output in response to predetermined input bits occurring when partial response equalization is performed normally, and outputs to the equalization error generation unit 1040 the temporarily decided level in response to the input bits as the temporary decision signal 1306. Temporary decision may not only be performed on the ultimate result in the path memory but may be performed on a candidate sequence in the path memory occurring in the middle of the selection. For example, if the path memory length is 64 bits, temporary decision may be performed on one of the candidate sequences occurring at the 24-th bit or the 32-th bit.

The equalization error generation unit 1040 receives the linear equalization signal from the first delay unit 1032, the nonlinear equalization signal from the second delay unit 1034, and the temporary decision signal 1306 from the Viterbi decoder unit 1038. As mentioned before, the timing of these signals is aligned. The equalization error generation unit 1040 generates the linear equalization error signal 1300 based on the difference between the temporary decision signal 1306 and a sum of the linear equalization error and the nonlinear equalization signal. For example, the linear equalization error signal 1300 is derived by computing a sum of the linear equalization error and the nonlinear equalization signal and then subtracting the temporary decision signal 1306 from sum. The equalization error generation unit 1040 generates the nonlinear equalization error signal 1302 based on the difference between the temporary decision signal 1306 and the sum of the linear equalization error and the nonlinear equalization signal. For example, the nonlinear equalization error signal 1302 is derived by computing a sum of the linear equalization error and the nonlinear equalization signal and then subtracting the temporary decision signal 1306 from sum. The equalization error generation unit 1040 outputs the linear equalization error signal 1300 to the linear equalizer unit 1044 and outputs the nonlinear equalization error signal 1302 to the nonlinear equalizer unit 1046.

The nonlinear equalizer unit 1046 updates a plurality of coefficients of the neural network based on the nonlinear equalization error signal 1302. The operation of the nonlinear equalizer unit 1046 is unstable until the tap coefficients converge. As a result, the likelihood of the data sequence output from the Viterbi decoder unit 1038 being in error is increased. It is therefore not desirable to feed the sum signal to the Viterbi decoder unit 1038 before convergence takes place. To address this issue, the decision unit 1042 determines on convergence of a plurality of tap coefficients in the nonlinear equalizer unit 1046. More specifically, the decision unit 1042 integrates the square values of the nonlinear equalization error signal 1302 by cumulatively adding the values for a certain period of time. In other words, the decision unit 1042 compares the integrated value with a threshold value and determines that convergence occurs when the integrated value drops below the threshold value. If the integrated value is larger than the threshold value, the decision unit 1042 determines that convergence does not take place. The decision unit 1042 outputs the result of decision to the adder unit 1036 and the equalization error generation unit 1040. The decision result indicates whether convergence takes place.

Unless the decision unit 1042 determines that convergence takes place, i.e., if it is determined that convergence does not take place, the adder unit 1036 outputs the linear equalization signal from the linear equalizer unit 1044 to the Viterbi decoder unit 1038 without outputting the aforementioned sum signal to the Viterbi decoder unit 1038. Meanwhile, if the decision unit 1042 determines that convergence takes place, the sum unit 1036 outputs the sum signal to the Viterbi decoder unit 1038 as described above. In other words, the linear equalization signal is output to the Viterbi decoder unit 1038 until convergence occurs. Once convergence occurs in the neural network, the sum signal is output to the Viterbi decoder unit 1038. This mitigates adverse effects from the nonlinear equalization signal.

Until the decision unit 1042 determines that convergence takes place, the equalization error generation unit 1040 generates the linear equalization error signal 1300 based on the difference between the linear equalization signal and the temporary decision signal 1306 and without using the nonlinear equalization signal. The equalization error generation unit 1040 causes the linear equalizer unit 1044 to derive a plurality of tap coefficients based on the linear equalization error signal 1300. Meanwhile, when the decision unit 1042 determines that convergence takes place, the equalization error generation unit 1040 operates as described above. Further, the equalization error generation unit 1040 generates the nonlinear equalization error signal 1302 based on the difference between the temporary decision signal 1306 and the sum of the linear equalization signal and the nonlinear equalization signal irrespective of the result of decision by the decision unit 1042. This will also mitigates adverse effects from the nonlinear equalization signal. When the integrated value, which is a sum of square values of the nonlinear equalization error signal 1302, grows larger than the threshold value again subsequent to the determination of convergence, the decision unit 1042 determines that the plurality of tap coefficients of the nonlinear equalizer unit 1046 diverge. In this process, the decision unit 1042 causes the nonlinear equalizer unit 1046 to derive new tap coefficients. When the integrated value drops reaches a predetermined convergence value or lower, the nonlinear equalizer unit 1046 may merely stops updating the plurality of tap coefficients.

If the neural network can initially be configured with tap coefficients close to convergence values, the sum signal produced by adding the linear equalization signal to the nonlinear equalization signal may be output to the Viterbi decoder unit 1038 from the start. Determination that the nonlinear equalization error signal 1302 takes place may not be made when the integrated value reaches the threshold value or below but may be made when a predetermined period of time has elapsed.

Figure 14:
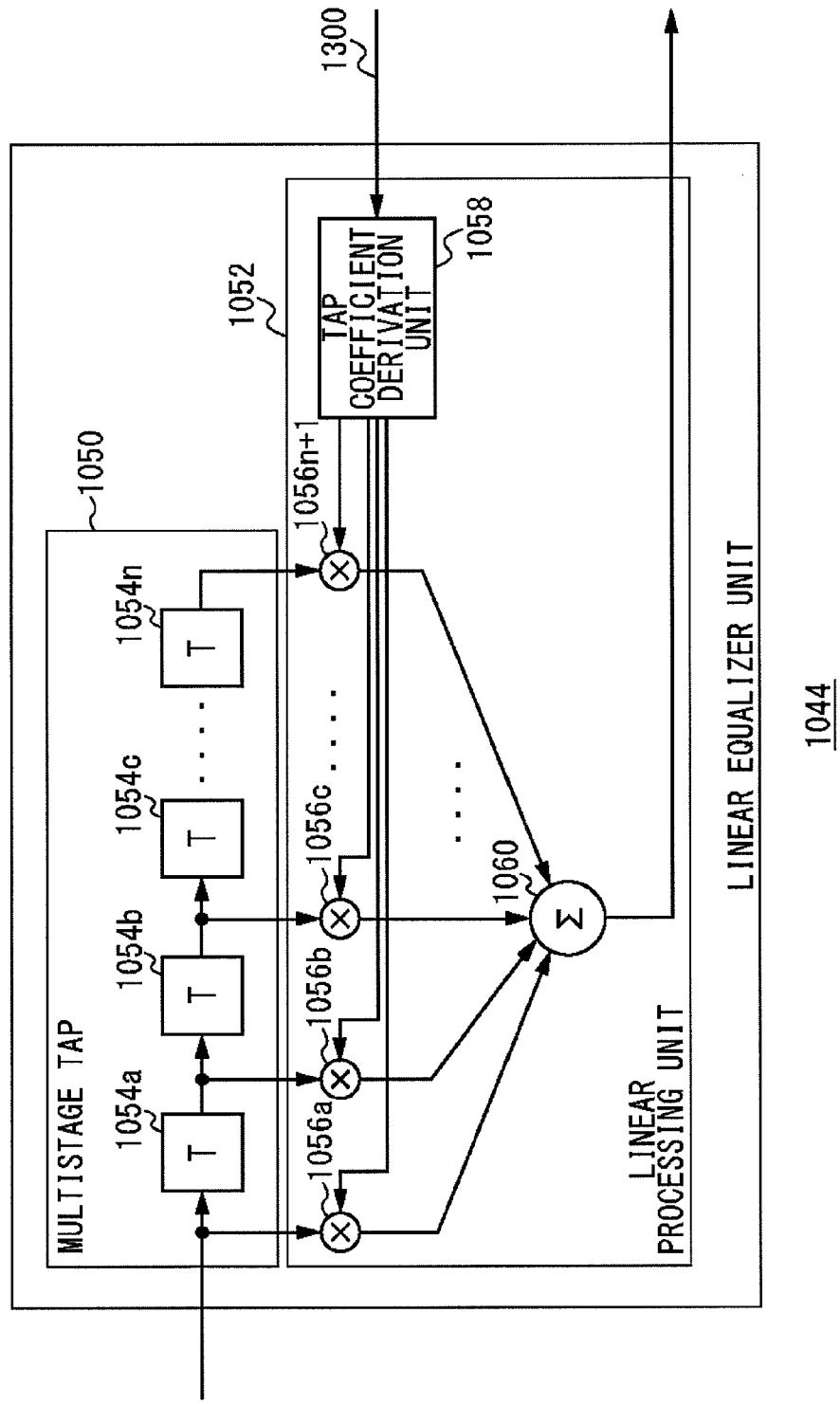
FIG. 14 shows the configuration of the linear equalizer unit of FIG. 13.

FIG. 14 shows the configuration of the linear equalizer unit 1044. The linear equalizer unit 1044 includes a multistage tap 1050 and a linear processing unit 1052. The multistage tap 1050 includes a first delay tap 1054a, a second delay tap 1054b, a third delay tap 1054c, and an N-th delay tap 1054n, which are generically referred to as a delay tap 1054. The linear processing unit 1052 includes a first multiplier unit 1056a, a second multiplier unit 1056b, a third multiplier unit 1056c, and an N+1 multiplier unit 1056n+1, which are generically referred to as multiplier units 1056, a tap coefficient derivation unit 1058, and an integration unit 1060.

The multistage tap 1050 is formed by connecting a plurality of delay taps 1054 serially. More specifically, the first delay tap 1054a receives the reproduction signal, delays the signal, and outputs the reproduction signal again. The second delay tap 1054b receives the reproduction signal from the first delay tap 1054a, delays the signal, and outputs the reproduction signal. The third through N-th delay taps 1054c-1054n perform the same process. The input to the delay tap 1054 and the output therefrom provide output signals from the multistage tap 1050. For example, when four delay taps 1054 are provided, there are five output signals. These output signals are output to the multiplier 1056.

The multiplier unit 1056 receives an output signal from the delay tap 1054 and also receives the tap coefficient from the tap coefficient derivation unit 1058. The tap coefficient is derived in association with the corresponding output signal. The multiplier unit 1056 multiplies the output signal by the tap coefficient. The multiplier unit 1056 outputs the result of multiplication to the integration unit 1060. The integration unit 1060 determines an integrated value, which is a result of sequentially adding the results of multiplication from the multiplier unit 1056. The integrated value resulting from the addition represents the linear equalization signal mentioned before. The integration unit 1060 outputs the linear equalization signal. The tap coefficient derivation unit 1058 receives the linear equalization error signal 1300. The tap coefficient derivation unit 1058 uses the linear equalization error signal 1300 and the results of multiplication in the multiplier unit 1056 to control the plurality of tap coefficients such that the reproduction signal matches the partial response characteristics. By using an adaptive algorithm such as the LMS algorithm to derive tap coefficients, the linear equalization error signal 1300 is controlled to be small. The LMS algorithm is a publicly known technology and the description thereof is omitted.

Figure 15:
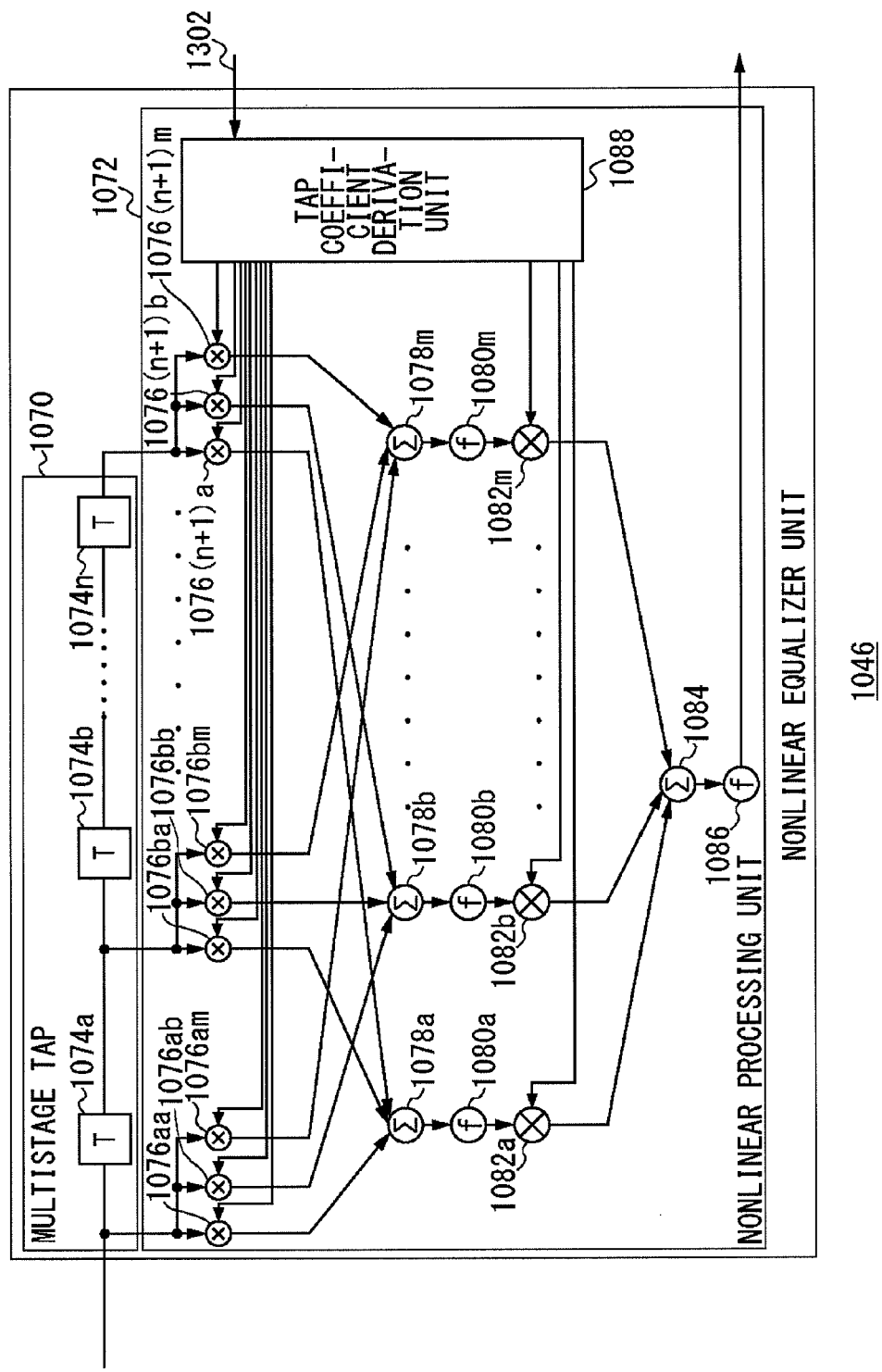
FIG. 15 shows the configuration of the nonlinear equalizer unit of FIG. 13.

FIG. 15 shows the configuration of the nonlinear equalizer unit 1046. The nonlinear equalizer unit 1046 includes a multistage tap 1070 and a nonlinear processing unit 1072. The multistage tap 1070 includes a first delay tap 1074a, a second delay tap 1074b, and an N-th delay tap 1074n, which are generically referred to as a delay tap 1074. The nonlinear processing unit 1072 includes an 11-th multiplier unit 1076aa, a 12-th multiplier unit 1076ab, a 1M-th multiplier unit 1076am, a 21-th multiplier unit 1076ba, a 22-th multiplier unit 1076bb, a 2M-th multiplier unit 1076bm, an (N+1)1-th multiplier unit 1076(n+1)a, a (N+1)2-th multiplier unit 1076(n+1)b, an (N+1)M-th multiplier unit 1076(n+1)m, which are generically referred to as a multiplier unit 1076, a first integration unit 1078a, a second integration unit 1078b, an M-th integration unit 1078m, which are generically referred to as an integration unit 1078, a first function operation unit 1080a, a second function operation unit 1080b, an M-th functional operation unit 1080m, which are generically referred to as a function operation unit 1080, a first multiplier unit 1082a, a second multiplier unit 1082b, an M-th multiplier unit 1082m, which are generically referred to as a multiplier unit 1082, an integration unit 1084, a function operation unit 1086, and a tap coefficient derivation unit 1088.

The nonlinear equalizer unit 1046 is configured as a three-layer perceptron neural network as illustrated. The input layer represents the multistage tap 1070, the hidden layer represents the function operation unit 1080, and the output layer represents the function operation unit 1086. The multistage tap 1070 is formed by connecting a plurality of delay taps 1074 serially. More specifically, the first delay tap 1074a receives the reproduction signal, delays the signal, and outputs the reproduction signal again. The second delay tap 1074b receives the reproduction signal from the first delay tap 1074a, delays the signal, and outputs the reproduction signal. The N-th delay tap 1074n performs a similar process. The input to the delay tap 1074 and the output therefrom provide output signals from the multistage tap 1070. These output signals are output to the multiplier 1076.

The multiplier 1076 multiplies the output signal from the multistage tap 1070 by the tap coefficient from the tap coefficient derivation unit 1088. More specifically, the IJ-th multiplier unit 1076ij generates a result of multiplication U(i,j) by multiplying the i-th output signal S(i) from the start of the multistage tap 1070 by the tap coefficient $W1(i,j)$. The integration unit 1078 performs integration by sequentially adding the results of multiplication by the multiplier units 1076. To describe it in more specific terms, the J-th integration unit 1078j generates an integration result V(j) by cumulatively adding the multiplication results U(1,j), U(2,j), U(3,j), . . . U(n+1,j). The function operation unit 1080 substitutes the integration result V(j) in the integration unit 1078 into a sigmoid function. The sigmoid function is given as follows.

$$f(x)=(1-\exp(-\alpha x))/(1+\exp(-\alpha x)) \quad \text{(expression 7)}$$

The integration result V(j) is substituted into x of expression 7. The result of operation in the J-th function operation unit 1080j is denoted by X(j), which represents the output from the hidden layer.

The multiplier 1082 multiplies the result of operation in the function operation unit 1080 by the tap coefficient from the tap coefficient derivation unit 1088. To describe it in more specific terms, the J-th multiplier unit 1082j generates the result of operation Y(j) by multiplying the result of operation X(j) in the J-th function operation unit 1080j by the tap coefficient $W2(j)$. The integration unit 1084 performs integration by sequentially adding the results of multiplication by the multiplier units 1082. The results of multiplication in all multiplier units 1082 are integrated by cumulative addition to generate a result of integration Z. The function operation unit 1086 substitutes the result of integration in the integration unit 1084 into a sigmoid function. In this case, the integration result Z is substituted into x of expression 7. The result of operation in the function operation unit 1086 represents the output from the output layer and the nonlinear equalization signal mentioned above.

The tap coefficient derivation unit 1088 derives the tap coefficients $W1(i,j)$ and $W2(j)$ used in the multiplier units 1076 and the multiplier units 1082, respectively. A random value or a value close convergence is defined as an initial value of $W1(i,j)$ and $W2(j)$. Like the tap derivation unit 1058 of FIG. 14, the tap coefficient derivation unit 1088 updates $W1(i,j)$ and $W2(j)$ using the LMS algorithm. $W1(i,j)$ and $W2(j)$ are learned by back propagation. The square value of the nonlinear equalization error signal 1302 is given as follows.

$$E=(A-D)^2 \quad \text{(expression 8)}$$

where A denotes the sum of the linear equalization signal and the nonlinear equalization signal, and D denotes the temporary decision signal 1306. In other words, A−D represents the nonlinear equalization error signal 1302. The tap coefficient derivation unit 1088 controls $W1(i,j)$ and $W2(j)$ so that E is minimized. The result of back propagation in the output layer is given as follows.

$$(\partial E)/(\partial Y(j))=f'(Y(j))\times 2(A-D) \quad \text{(expression 9)}$$

The tap coefficient derivation unit 1088 updates the tap coefficient $W2(j)$ as follows.

$$W2(j)=W2(j)_{old}-\epsilon\times(\partial E)/(\partial W2(j)) \quad \text{(expression 10).}$$

where $W2(j)_{old}$ denotes the tap coefficient $W2(j)$ occurring at the immediately preceding point of time. Meanwhile, back propagation in the hidden layer is given as follows.

$$(\partial E)/(\partial U(i,j))=f'(U(i,j))\times(\partial E)/(\partial Y(j))\times W2(j) \quad \text{(expression 11)}$$

The tap coefficient derivation unit 1088 updates the tap coefficient $W1(i,j)$ as follows.

$$W1(i,j)=W1(i,j)_{old}-\epsilon\times(\partial E)/(\partial W1(i,j)) \quad \text{(expression 12)}$$

where $W1(i,j)_{old}$ denotes the tap coefficient $W1(i,j)$ occurring at the immediately preceding point of time.

Figure 16:
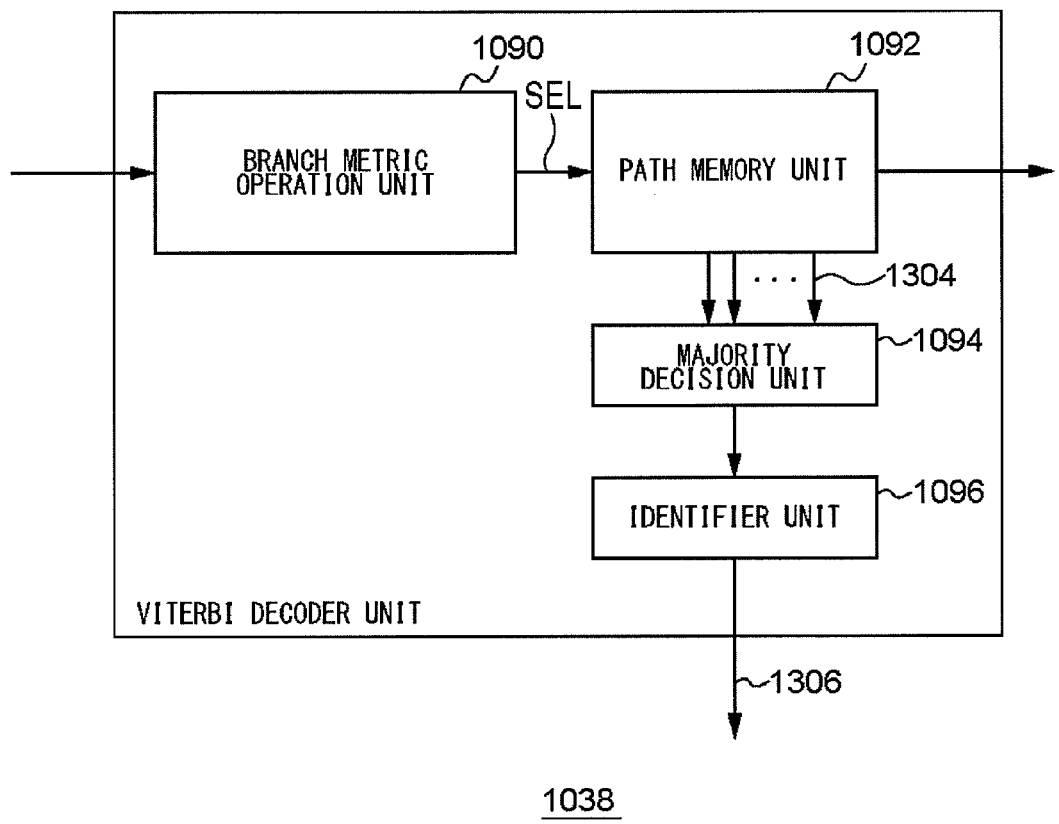
FIG. 16 shows the configuration of the Viterbi decoder unit of FIG. 13.

FIG. 16 shows the configuration of the Viterbi decoder unit 1038. The Viterbi decoder unit 1038 includes a branch metric operation unit 1090, a path memory unit 1092, a majority decision unit 1094, and an identifier unit 1096. The Viterbi decoder unit 1038 also includes a selection signal SEL and a bit signal 1304. The branch metric operation unit 1090 performs branch metric operation and path metric operation based on the linear equalization signal or the sum signal (hereinafter, generically referred to as "sum signal") from the adder unit 1036 (not shown). For this purpose, the branch metric operation unit 1090 includes the branch metric operation circuit and the path metric operation circuit mentioned above. As mentioned above, the embodiment uses the partial response method. Before describing the configuration of the Viterbi decoder unit 1038, state transition according to the partial response method will be described.

Figure 17:
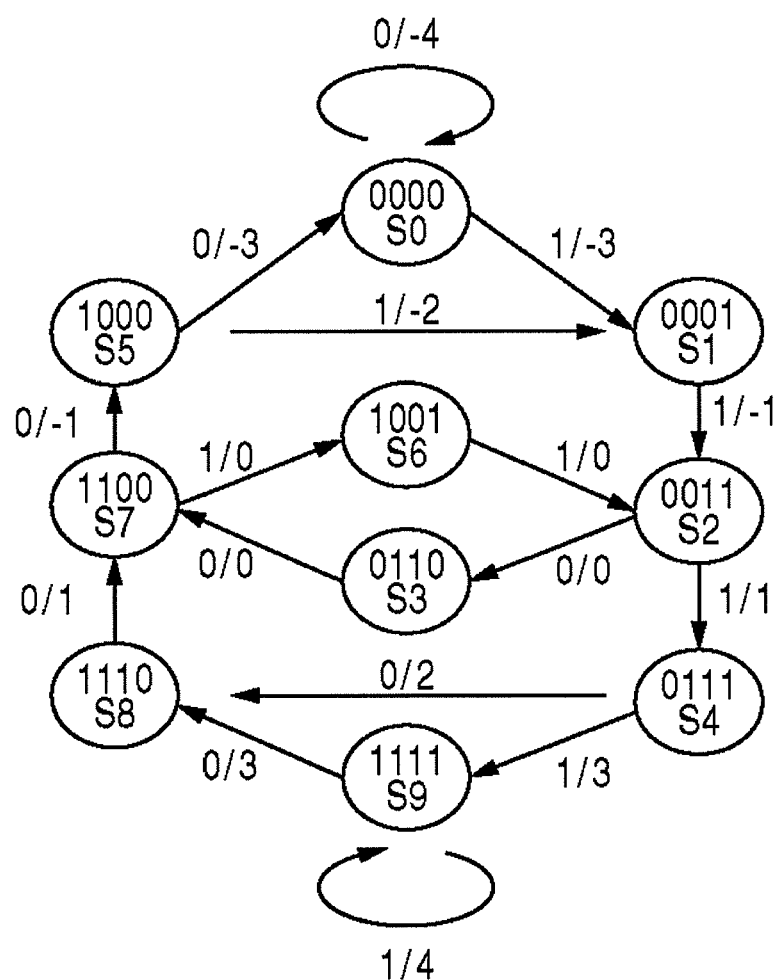
FIG. 17 shows state transition occurring when the Viterbi decoder unit of FIG. 16 is compatible with a partial response (1,2,2,2,1)
Figure 18:
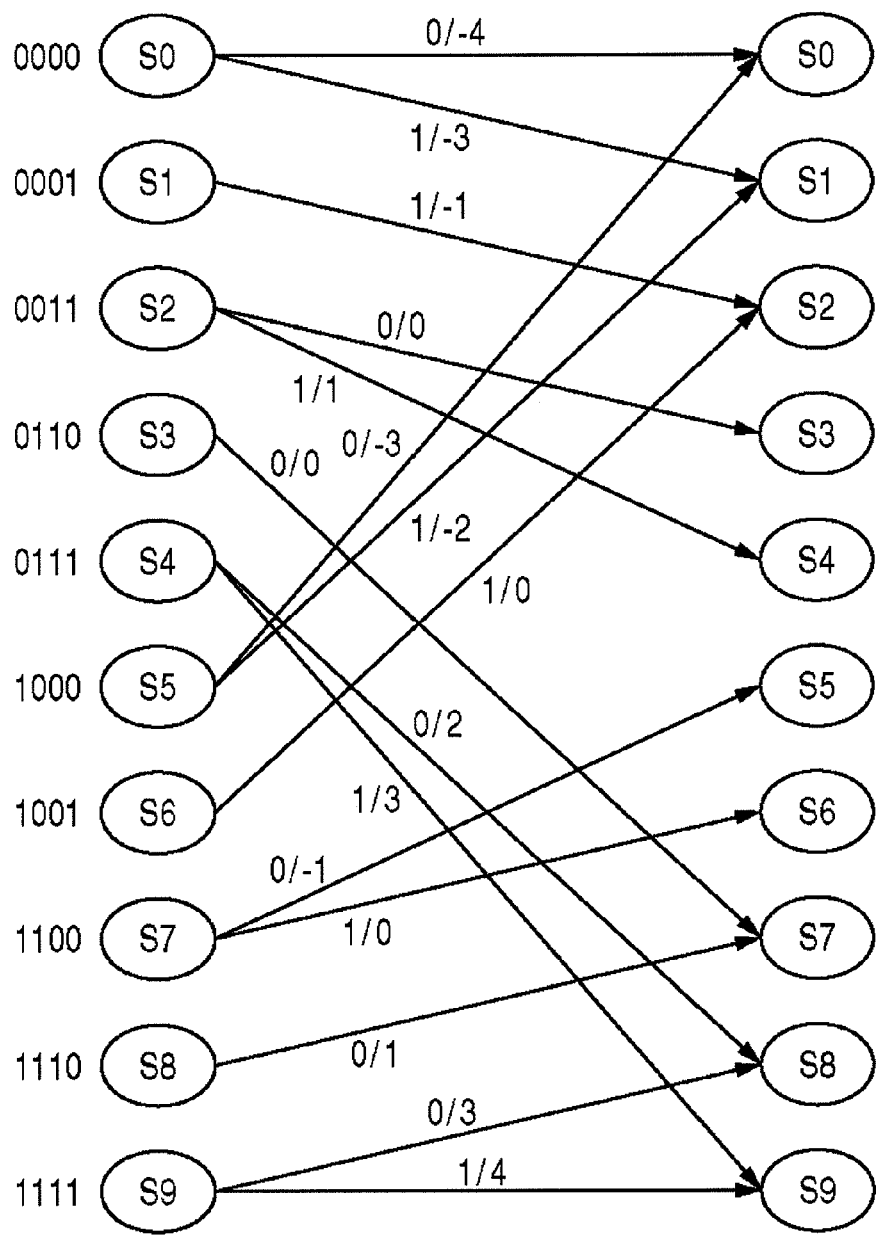
FIG. 18 shows another state transition occurring when the Viterbi decoder unit of FIG. 16 is compatible with a partial response (1,2,2,2,1)

FIG. 17 shows state transition occurring when the Viterbi decoder unit 1038 is compatible with a partial response (1,2,2,2,1). In the partial response (1,2,2,2,1), the amplitude is accommodated within the range of ±4. Given that four bits form a single combination, ten states from S0 to S9 are defined in accordance with the value included in the combination. The state makes a transition as illustrated depending on the bit value subsequently input. For example, when the bit value "1" is input in the state S0, transition to the state S1 takes place. The figure shows values in the format "x/y" adjacent to the arrows, where x denotes an input bit value and y denotes a temporary decision value in response to the 5 bits including a new bit value added to the original state. FIG. 18 shows state transition occurring when the Viterbi decoder unit 1038 is compatible with a partial response (1,2,2,2,1). FIG. 18 shows states occurring at two successive points of time, where each state is the same as the state shown in FIG. 17.

Figure 19:
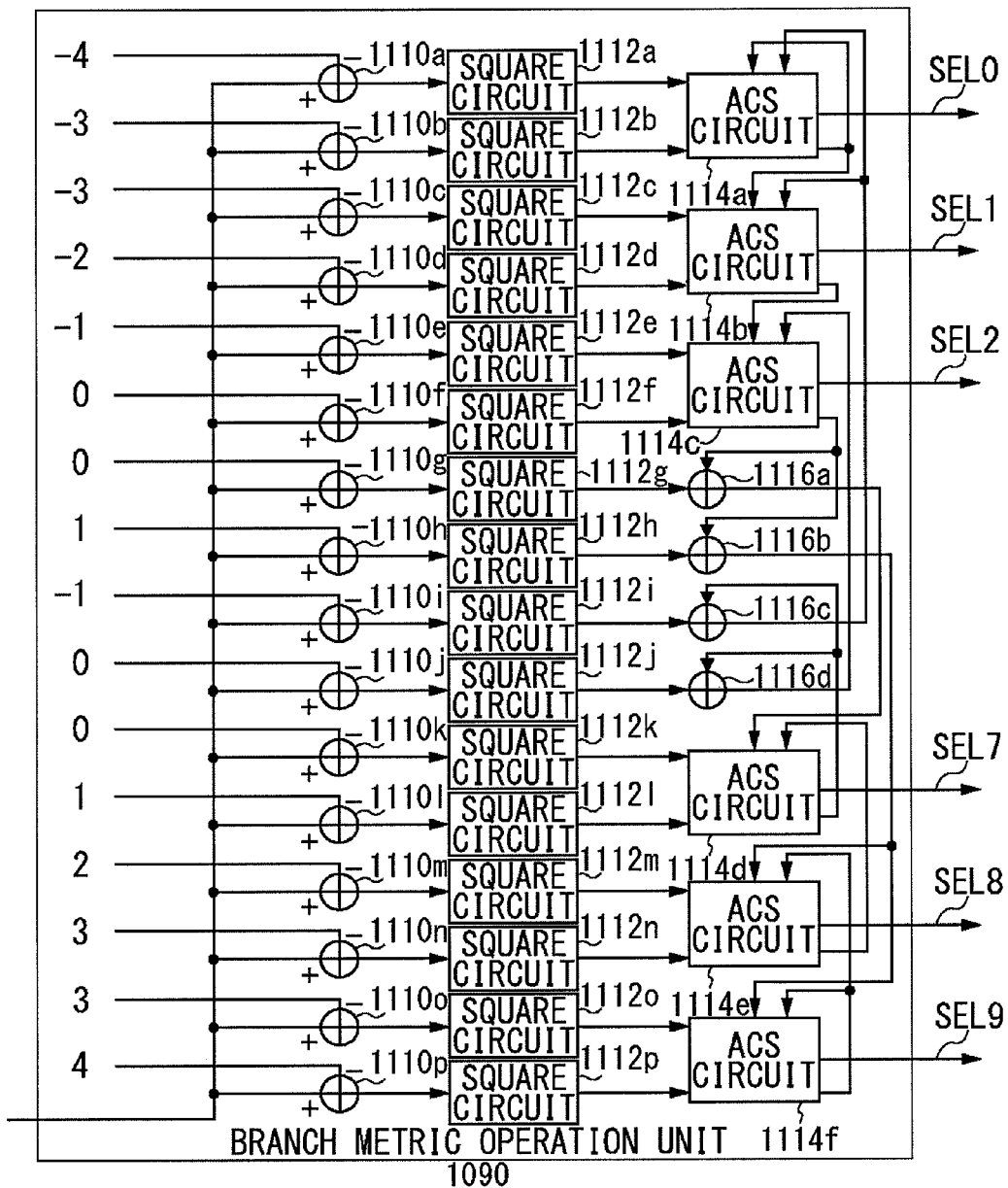
FIG. 19 shows the configuration of the branch metric operation unit of FIG. 16.

FIG. 19 shows the configuration of the branch metric operation unit 1090. The branch metric operation unit 1090 includes a first adder unit 1110a, a second adder unit 1110b, a third adder unit 1110c, a fourth adder unit 1110d, a fifth adder unit 1110e, a sixth adder unit 1110f, a seventh adder unit 1110g, an eighth adder unit 1110h, a ninth adder unit 1110i, a tenth adder unit 1110j, an eleventh adder unit 1110k, a twelfth adder unit 1110l, a thirteenth adder unit 1110m, a fourteenth adder unit 1110n, a fifteenth adder unit 1110o, a sixteenth adder unit 1110p, which are generically referred to as an adder unit 1110, a first square circuit 1112a, a second square circuit 1112b, a third square circuit 1112c, a fourth square circuit 1112d, a fifth square circuit 1112e, a sixth square circuit 1112f, a seventh square circuit 1112g, an eighth square circuit 1112h, a ninth square circuit 1112i, a tenth square circuit 1112j, an eleventh square circuit 1112k, a twelfth square circuit 1112l, a thirteenth square circuit 1112m, a fourteenth square circuit 1112n, a fifteenth square circuit 1112o, a sixteenth square circuit 1112p, which are generically referred to as a square circuit 1112, a first ACS circuit 1114a, a second ACS circuit 1114b, a third ACS circuit 1114c, a fourth ACS circuit 1114d, a fifth ACS circuit 1114e, a sixth ACS circuit 1114f, which are generically referred to as an ACS circuit 1114, a first adder 1116a, a second adder 1116b, a third adder 1116c, and a fourth adder 1116d, which are generically referred to as an adder 116. The branch metric operation unit 90 also includes a 0-th selection signal SEL0, a first selection signal SEL1, a second selection signal SEL2, a seventh selection signal SEL7, an eighth selection signal SEL8, and a ninth selection signal SEL9, which are generically referred to as a selection signal SEL.

The adder unit 1110 subtracts a predetermined target value from the sum signal. The square circuit 1112 computes a square of the result of subtraction in the adder unit 1110. The ACS circuit 1114 performs a metric operation by subjecting the square value from the square circuit 1112 to addition, comparison, and selection. The ACS circuit 1114 outputs a 0-th selection signal SEL0, a first selection signal SEL1, a second selection signal SEL2, a seventh selection signal SEL7, an eight selection signal SEL8, a ninth selection signal SEL9, as the result of metric operation. Some square values are not input to the ACS circuit 1114 due to the partial response characteristics. Such square values are subject to addition in the adder unit 1116.

Figure 20:
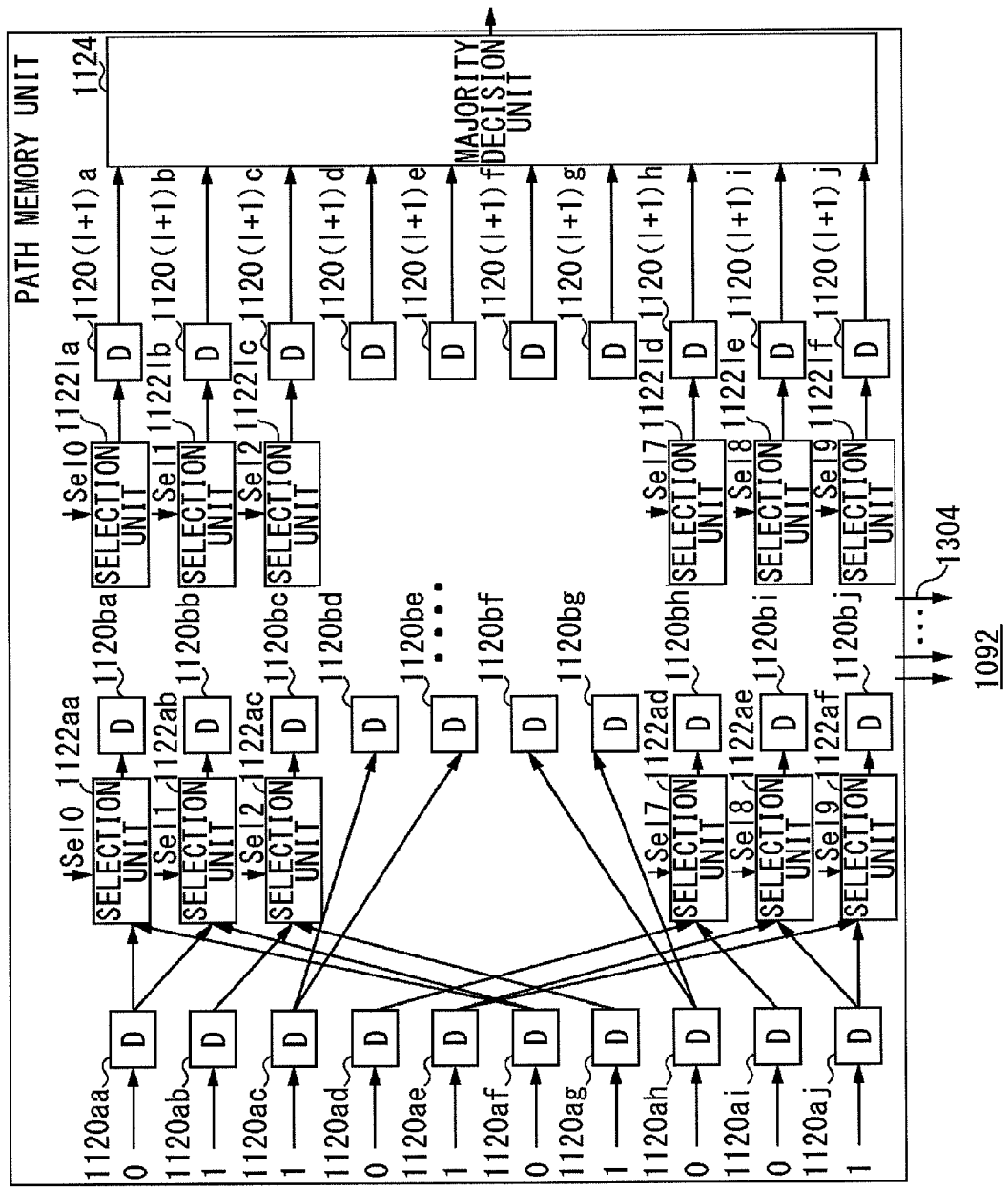
FIG. 20 shows the configuration of the path memory unit of FIG. 16.

FIG. 20 shows the configuration of the path memory unit 1092. The path memory unit 1092 receives a selection signal SEL from the branch metric operation unit 1090 and stores a path as determined by the selection signal SEL. FIG. 20 shows the configuration of the path memory unit 1092. The path memory unit 1092 includes an eleventh memory 1120aa, a twelfth memory 1120ab, a thirteenth memory 1120ac, a fourteenth memory 1120ad, a fifteenth memory 1120ae, a sixteenth memory 1120af, a seventeenth memory 1120ag, an eighteenth memory 1120ah, a nineteenth memory 1120ai, a 110-th memory 1120aj, a twenty first memory 1120ba, a twenty second memory 1120bb, a twenty third memory 1120bc, a twenty fourth memory 1120bd, a twenty fifth memory 1120be, a twenty sixth memory 1120bf, a twenty seventh memory 1120bg, a twenty eighth memory 1120bh, a twenty ninth memory 1120bi, a 210-th memory 1120bj, an (L+1)1-th memory 1120(l+1)a, an (L+1)2-th memory 1120(l+1)b, an (L+1)3-th memory 1120(l+1)c, an (L+1)4-th memory 1120(l+1)d, an (L+1)5-th memory 1120(l+1)e, an (L+1)6-th memory 1120(l+1)f, an (L+1)7-th memory 1120(l+1)g, an (L+1)8-th memory 1120(l+1)h, an (L+1)9-th memory 1120(l+1)i, an (L+1)10-th memory 1120(l+1)j, which are generically referred to as a memory 1120, an eleventh selector unit 1122aa, a twelfth selector unit 1122ab, a thirteenth selector unit 1122ac, a fourteenth selector unit 1122ad, a fifteenth selector unit 1122ae, a sixteenth selector unit 1122af, an L1-th selector unit 11221a, an L2-th selector unit 11221b, an L3-th selector unit 11221c, an L4-th selector unit 11221d, an L5-th selector unit 11221e, an L6-th selector unit 11221f, which are generically referred to as a selector unit 1122, and a majority decision unit 1124.

A total of L+1 memories 1120 store a single path and ten paths are stored in association with ten states shown in FIGS. 17 and 18. The selector unit 1122 selects one of the paths in accordance with a selection signal SEL. The selected path represents a surviving path. The majority decision unit 1124 receives the bit values stored in the (L+1)1-th memory 1120(l+1)a through the (L+1)10-th memory 1120(l+1)j and performs majority decision. The bit value selected by majority decision represents a decoding result. The majority decision unit 1124 outputs the decoding result. The bit value stored in a memory 1120 in the middle of the path is output as the bit signal 1304. The bit signal 1304 includes ten bit values from the ten paths corresponding to the same timing. Reference is made back to FIG. 16.

The majority decision unit 1094 receives the bit signal 1304 and performs majority decision on the ten bit values included in the bit signal 1304. The majority decision unit 1094 outputs the bit value selected by majority decision (hereinafter, referred to as "selected value") to the identifier unit 1096. The identifier unit 1096 receives the selected value from the majority decision unit 1094 and stores the selected value in a latch. The identifier 1096 selects a single combination from the selected values occurring at five points of time including those in the past. When a new selected value is input to the identifier unit 1096, the selected value most remote in the past is removed from the combination, updating the combination.

FIG. 21 shows the data structure of a table stored in the identifier unit 1096. As illustrated, the table includes a memory value field 1200, a b(k) field 1202, a b(k−1) field 1204, a b(k−2) field 1206, a b(k−3) field 1208, a b(k−4) field 1210, and a temporary decision output field 1212. b(k) represents the selected value most recently input, b(k−1) represents the selected value input at an immediately preceding point of time, b(k−4) represents the selected value input at a point of time four steps in the past. As mentioned before, the values are stored in a latch. The b(k) field 1202 through the b(k−4) field 1210 indicate a combination that the selected values stored in the latch may take. The memory value field 1200 contains a memory value corresponding to the value that can be taken. The temporary decision output field 1212 contains a temporary decision value corresponding to the value that can be taken. For example, given that the content of a path memory is "00000", a temporary decision value of "−4" is stored in the field 1212. In the case of "00001", a temporary decision value of "−3" is stored. Reference is made back to FIG. 16. The identifier unit 1096 identifies a temporary decision value corresponding to the combination by referring to the table shown in FIG. 21. The identifier unit 1096 outputs the temporary decision value as the temporary decision signal 1306.

Figure 22:
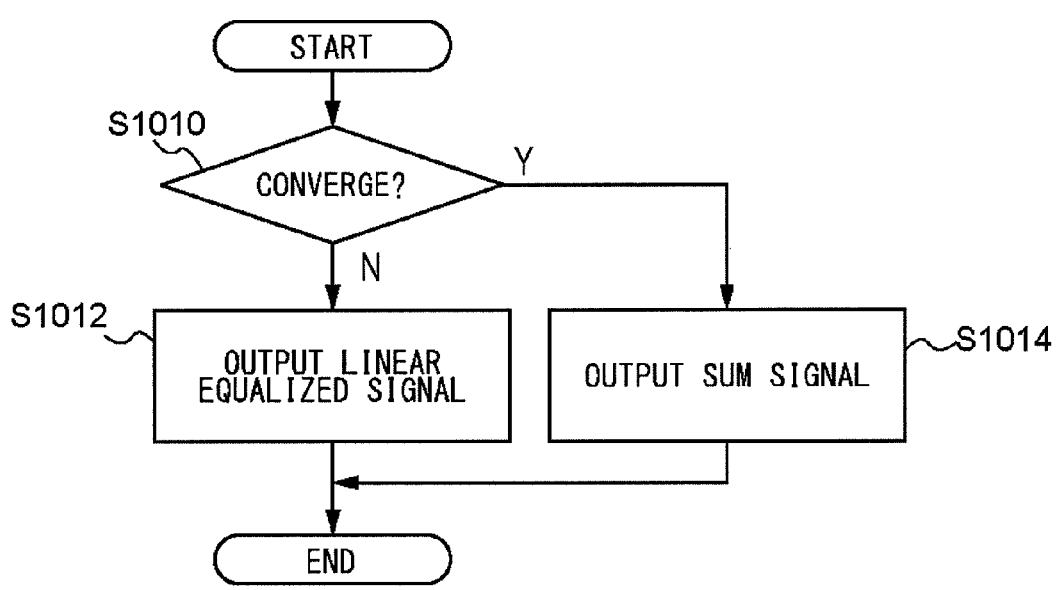
FIG. 22 is a flowchart showing the procedure of addition in the adder unit of FIG. 13.

A description will be given of the operation of the reproduction device 100 having the configuration described above. FIG. 22 is a flowchart showing the procedure of addition in the adder unit 1036. The decision unit 1042 receives the nonlinear equalization error signal 1302 and derives the magnitude of the nonlinear equalization error signal 1302. If the magnitude of the nonlinear equalization error signal 1302 does not converge below a threshold value (N in S1010), the decision unit 1042 causes the adder unit 1036 to output the linear equalization signal (S1012). Meanwhile, if the magnitude of the nonlinear equalization error signal 1302 converges below the threshold value (Y in S1010), the decision unit 1042 causes the adder unit 1036 to output the sum signal (S1014).

Figure 23:
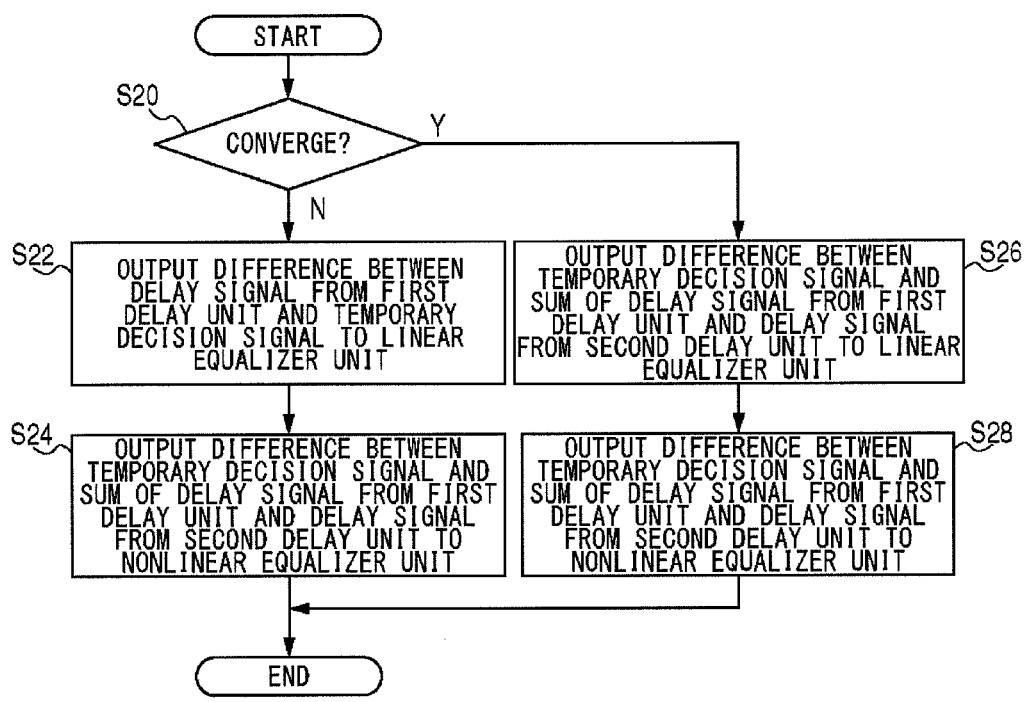
FIG. 23 is a flowchart showing the procedure for generation in the equalization error generation unit of FIG. 13.

FIG. 23 is a flowchart showing the procedure for generation in the equalization error generation unit 1040. The decision unit 1042 receives the nonlinear equalization error signal 1302 and derives the magnitude of the nonlinear equalization error signal 1302. If the magnitude of the nonlinear equalization error signal 1302 does not converge below a threshold value (N in S20), the equalization error generation unit 1040 outputs the difference between the delayed signal from the first delay unit 1032 and the temporary decision signal 1306 to the linear equalizer unit 1044 as the linear equalization error signal 1300 (S22). The equalization error generation unit 1040 outputs the difference between the temporary decision signal 1306 and the sum of the delayed signal from the first delay unit 1032 and the delayed signal from the second delay unit 1034 to the nonlinear equalizer unit 1046 as the nonlinear equalization error signal 1302 (S24). Meanwhile, if the magnitude of the nonlinear equalization error signal 1302 converges below a threshold value (Y in S20), the equalization error generation unit 1040 outputs the difference between the temporary decision signal 1306 and the sum of the delayed signal from the first delay unit 1032 and the delayed signal from the second delay unit 1034 to the linear equalizer unit 1044 as the linear equalization error signal 1300 (S26). The equalization error generation unit 1040 outputs the difference between the temporary decision signal 1306 and the sum of the delayed signal from the first delay unit 1032 and the delayed signal from the second delay unit 1034 to the nonlinear equalizer unit 1046 as the nonlinear equalization error signal 1302 (S28).

Figure 24:
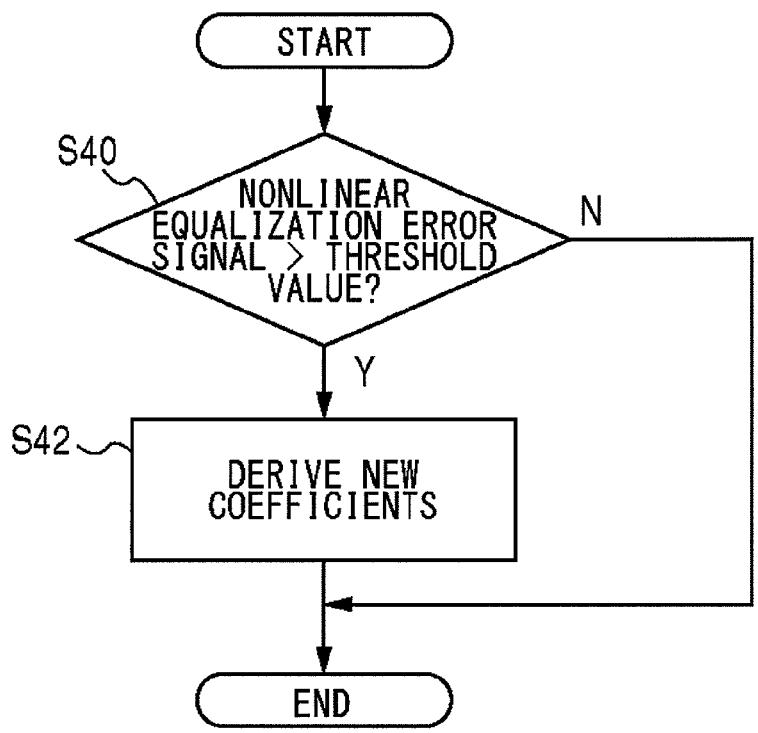
FIG. 24 is a flowchart showing the procedure of deriving coefficients in the nonlinear equalizer unit of FIG. 13.

FIG. 24 is a flowchart showing the procedure of deriving coefficients in the nonlinear equalizer unit 1046. Even after the magnitude of the nonlinear equalization error signal 1302 has converged, the decision unit 1042 continues to derive the magnitude of the nonlinear equalization error signal 1302. When the magnitude grows larger than the threshold value (Y in S40), the linear equalizer unit 1044 causes the nonlinear equalizer unit 1046 to derive new tap coefficients (S42). When the magnitude does not grow larger than the threshold (N in S40), the process is terminated.

According to the embodiment of the present invention, linear equalization and nonlinear equalization are performed in parallel, the linear equalization signal and the nonlinear equalization signal are added, and the result of subjecting the sum signal to temporary decision is used as a teacher signal. Therefore, a temporary decision signal can be used as a teacher signal instead of a training signal. Since a temporary decision is used as a teacher signal instead of a training signal, the coefficients for nonlinear equalization can be derived without using a training signal. Since the coefficients for nonlinear equalization can be derived without using a training signal, nonlinear equalization can be performed without using a training signal. Since the coefficients for nonlinear equalization can be derived without using a training signal, nonlinear distortion in the reproduction signal resulting from improvement in the recording density or variation in the recording power can be adaptively reduced without using a training signal.

Since temporary decision in compliance with the partial response rule is performed, the system is compatible with a partial response process. The nonlinear equalization signal is not output to the Viterbi decoder unit until the coefficients for nonlinear equalization converge so that degradation of precision of a temporary decision signal is mitigated. Further, since degradation in precision of a temporary decision signal occurring until the coefficients for nonlinear equalization converge is mitigated, degradation of precision in an equalization process is mitigated even during an initial stage of processing. Since the nonlinear equalization signal is not used to derive the coefficients for linear equalization until the coefficients for nonlinear equalization converge, degradation in precision of deriving the coefficients is mitigated. Since degradation of precision of deriving the coefficients for linear equalization is mitigated until the coefficients for nonlinear equalization converge, degradation of precision in an equalization process even during an initial stage of processing. Further, since a plurality of new coefficients are derived when divergence of the nonlinear equalization error signal is detected, degradation in the equalization characteristics is mitigated.

Third Embodiment

Like the second embodiment, the third embodiment relates to a reproduction device in which a linear waveform equalizer and a nonlinear waveform equalizer are arranged in parallel. Both the linear equalizer unit and the nonlinear equalizer unit are provided with a multistage tap. In the reproduction device according to the third embodiment, the linear waveform equalizer and the nonlinear waveform equalizer share a multistage tap in order to reduce the circuit scale. The reproduction device 100 and the processing unit 24 according to the third embodiment are of the same type as those of FIGS. 1 and 13, respectively. The discussion here primarily concerns the difference from the second embodiment.

Figure 25:
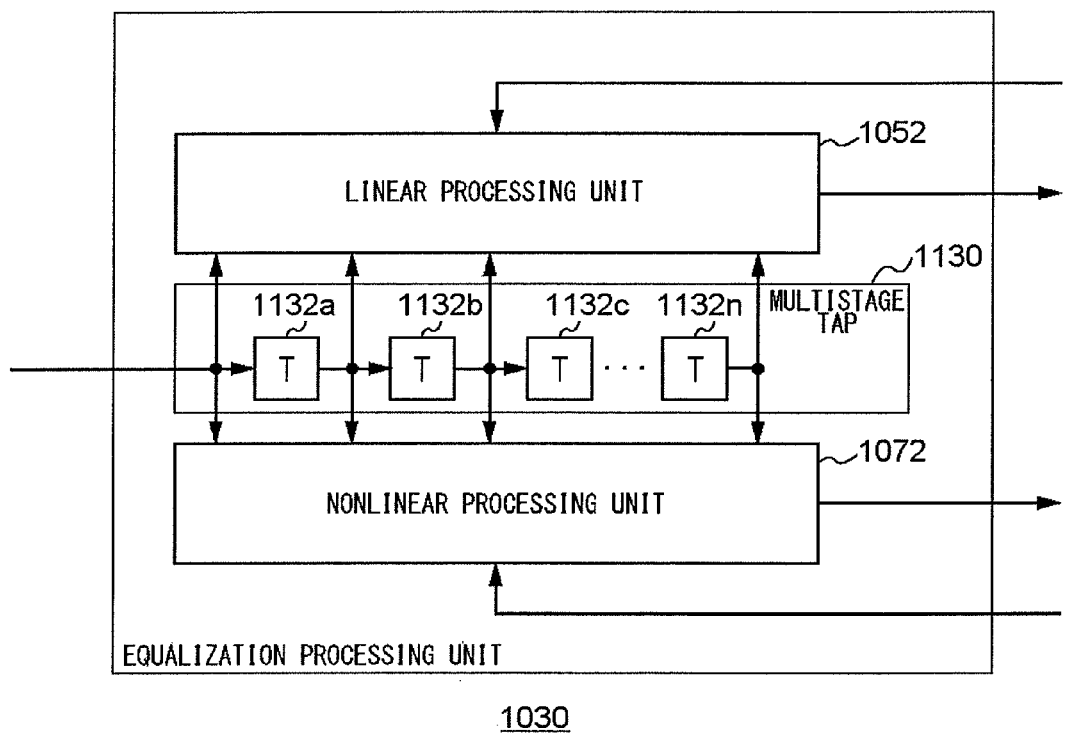
FIG. 25 shows the configuration of the equalization processing unit according to the third embodiment.

FIG. 25 shows the configuration of the equalization processing unit 1030 according to the third embodiment. The equalization processing unit 1030 comprises a linear processing unit 1052, a nonlinear processing unit 1072, and a multistage tap 1130. The multistage tap 1130 comprises a first delay tap 1132a, a second delay tap 1132b, a third delay tap 1132c, and an N-th delay tap 1132n, which are generically referred to as a delay tap 1132.

The multistage tap 1130 is configured in same manner as the multistage tap 1050 included in the linear equalizer unit 1044 of FIG. 14 or the multistage tap 1070 included in the nonlinear equalizer unit 1046 of FIG. 15 and comprises a plurality of delay taps 1132 connected serially. In other words, the multistage tap 1130 is shared by the linear equalizer unit and the nonlinear equalizer unit. The output from the multistage tap 1130 is delivered to the linear processing unit 1052 and also to the nonlinear processing unit 1072. The linear processing unit 1052 is configured as shown in FIG. 14, and the nonlinear processing unit 1072 is configured as shown in FIG. 15. The description will be omitted here.

According to this embodiment, the circuit scale is prevented from increasing since a multistage tap is shared by linear equalization and nonlinear equalization. The multistage tap performs the same process for linear equalization and nonlinear equalization because the tap is shared. Therefore, degradation in precision of processing for linear equalization and nonlinear equalization is mitigated. Further, the circuit scale is reduced, while also mitigating degradation in precision of equalization processing.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In the first embodiment of the present invention, both the linear equalizer unit 44 and the nonlinear equalizer unit 46 use a plurality of tap coefficients and adaptively derive a plurality of coefficients. Alternatively, the nonlinear equalizer unit 46 may adaptively derive a plurality of tap coefficients, and the linear equalizer unit 44 may use fixed values for a plurality of tap coefficients. In other words, linear equalizer unit 44 may not adaptively derive a plurality of tap coefficients. In this process, the first adder unit 40 does not output the linear equalization error signal 300 to the linear equalizer unit 44. According to this variation, the process is simplified since the coefficients for linear equalization are fixed.

Figure 26:
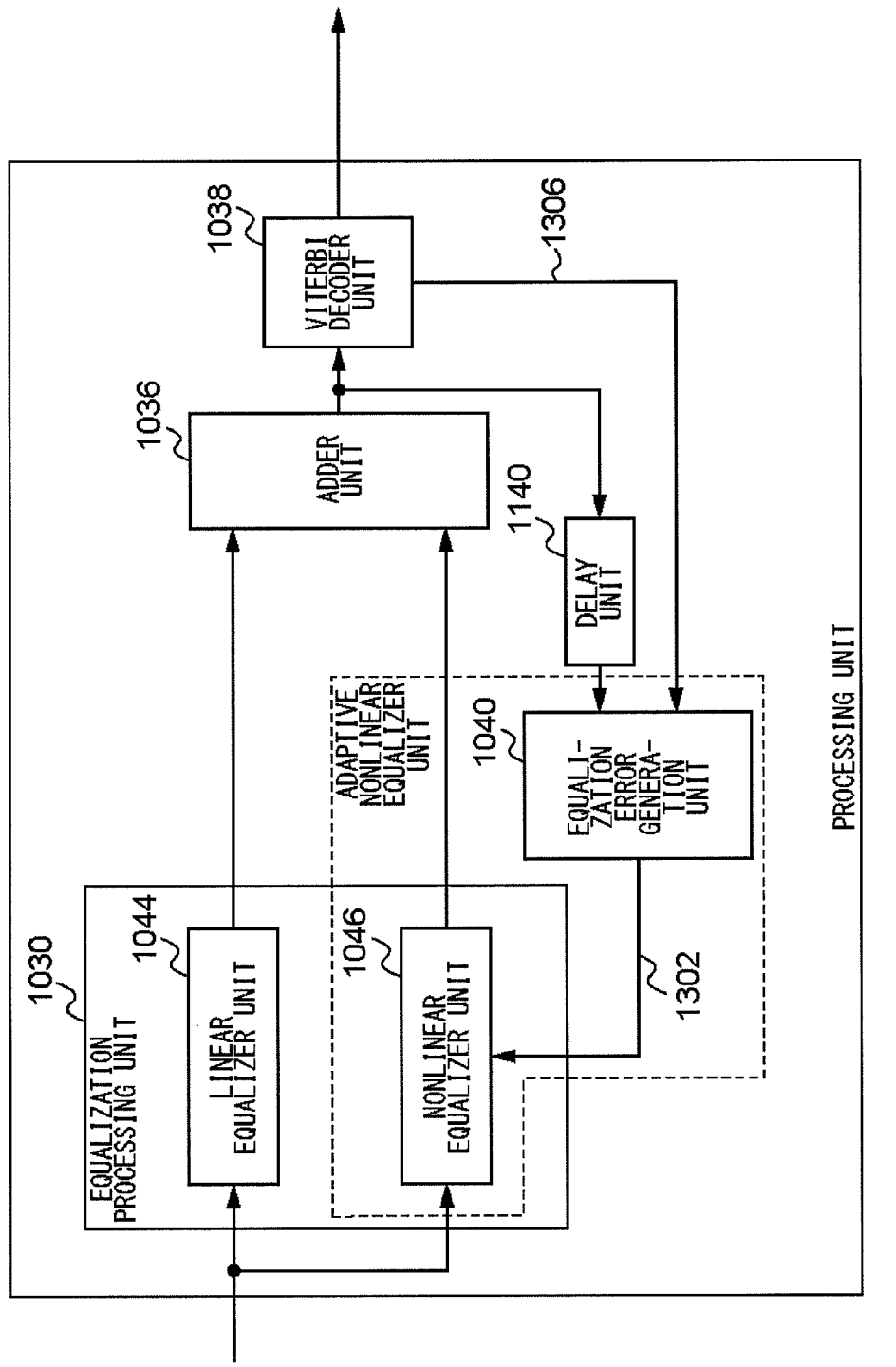
FIG. 26 shows the configuration of the processing unit according to a variation of the present invention.

In the second and third embodiments of the present invention, both the linear equalizer unit 1044 and the nonlinear equalizer unit 1046 use a plurality of tap coefficients and adaptively derive a plurality of coefficients. Alternatively, the nonlinear equalizer unit 1046 may adaptively derive a plurality of tap coefficients, and the linear equalizer unit 1044 may use fixed values for a plurality of tap coefficients. In other words, linear equalizer unit 1044 may not adaptively derive a plurality of tap coefficients. FIG. 26 shows the configuration of the processing unit 24 according to a variation of the present invention. Unlike the processing unit of FIG. 13, the processing unit is provided with a delay unit 1140. The following description primarily concerns a difference from FIG. 13. The adder unit 1036 adds the linear equalization signal from the linear equalizer unit 1044 and the nonlinear equalization signal from the nonlinear equalizer unit 1046. The delay unit 1140 delays the signal output from the equalization error generation unit 1040. The delay unit 1140 delays the signal for a duration commensurate with the processing delay in the Viterbi decoder unit 1038. The equalization error generation unit 1040 generates the nonlinear equalization error signal 1302 based on the difference between the signal delayed by the delay unit 1140 and the temporary decision signal 1306 from the Viterbi decoding unit 1038, and the nonlinear equalizer unit 1046 derives a plurality of coefficients based on the nonlinear equalization error signal 1302. According to the variation, the coefficients for linear equalization are fixed so that the stability of a equalization process is improved. Further, the process is simplified since the coefficients for linear equalization are fixed.

DESCRIPTION OF THE REFERENCE NUMERALS 10 optical disk, 12 optical disk driver unit, 14 optical pickup, 16 preamplifier unit, 18 AGC unit, 20 PLL unit, 22 A/D converter unit, 24 processing unit, 26 control unit, 30 temporary decision unit, 32 first delay unit, 34 second delay unit, 38 Viterbi decoder unit, 40 first adder unit, 42 second adder unit, 44 linear equalizer unit, 46 nonlinear equalizer unit, 100 reproduction device

INDUSTRIAL APPLICABILITY

According to the invention, nonlinear distortion in a reproduction signal resulting from improvement in the recording density or variation in the recording power can be reduced without using a training signal.

The invention claimed is:

1. An equalizer comprising:
a linear equalizer unit configured to sequentially subject a signal to be processed to linear equalization;
a temporary decision unit configured to sequentially subject a signal subjected to linear equalization by the linear equalizer unit to temporary decision according to a partial response rule;
a nonlinear equalizer unit implemented by a neural network and configured to derive a plurality of coefficients of a neural network using a signal subjected to temporary decision by the temporary decision unit as a teacher signal and without using a training signal, a known input in the presence of a given output, normally required for learning in a neural network, and to sequentially subject a signal subjected to linear equalization by the linear equalizer unit to nonlinear equalization based on the plurality of coefficients; and
delay unit configured to delay a signal subjected to nonlinear equalization by the nonlinear equalizer unit,
wherein the delay unit delays the signal for a duration commensurate with the difference between processing delay in the temporary decision unit and processing delay in the nonlinear equalizer unit,
the nonlinear equalizer unit derives the plurality of coefficients based on the difference between a signal delayed by the delay unit and a signal subjected to temporary decision by the temporary decision unit, and
wherein the nonlinear equalizer unit derives a plurality of new coefficients when the difference between the signal delayed by the delay unit and the signal subjected to temporary decision by the temporary decision unit grows larger than a threshold value.

2. An equalizer comprising:
a linear equalizer unit configured to sequentially subject the signal input to linear equalization;
an adaptive nonlinear equalizer unit implemented by a neural network and configured to sequentially subject the signal input to nonlinear equalization in parallel with the linear equalization by the linear equalizer unit;
an adder unit configured to add a signal subjected to nonlinear equalization by the nonlinear equalizer unit and a signal subjected to linear equalization by the linear equalizer unit;
a temporary decision unit configured to sequentially subject a signal resulting from the addition in the adder unit to temporary decision according to a partial response rule; and
a decision unit configured to determine whether the plurality of coefficients of a neural network in the adaptive nonlinear equalizer unit converge,
wherein the adaptive nonlinear equalizer unit derives a plurality of coefficients using a signal subjected to temporary decision by the temporary decision unit as a teacher signal and without using a training signal, a known input in the presence of a given output, normally required to cause a neural network to learn previously, and performs nonlinear equalization based on the plurality of coefficients, and wherein, unless the decision unit determines that convergence takes place, the adder unit outputs the signal subjected to linear equalization by the linear equalizer unit to the temporary decision unit instead of a signal resulting from the addition, and outputs a signal resulting from the addition to the temporary decision unit after the decision unit determines that convergence takes place.

3. The equalizer according to claim 2,
wherein the linear equalizer unit and the nonlinear equalizer unit share a multistage tap.

4. The equalizer according to claim 2, further comprising:
a first delay unit configured to delay a signal subjected to linear equalization by the linear equalizer unit; and
a second delay unit configured to delay a signal subjected to nonlinear equalization by the adaptive nonlinear equalizer unit;
wherein the first delay unit delays the signal for a duration commensurate with processing delay in the temporary decision unit,
the second delay unit delays the signal for a duration commensurate with processing delay in the temporary decision unit,
the adaptive nonlinear equalizer unit derives a plurality of coefficients based on a difference between a signal subjected to temporary decision by the temporary decision unit and a sum of a signal delayed by the first delay unit and a signal delayed by the second delay unit, and
the linear equalizer unit performs linear equalization using a plurality of coefficients, derives the plurality of coefficients based on a difference between a signal subjected to temporary decision by the temporary decision unit and a signal delayed by the first delay unit unless the decision unit determines that convergence takes place, and derives the plurality of coefficients based on a difference between a signal subjected to temporary decision by the temporary decision unit and a sum of a signal delayed by the first delay unit and a signal delayed by the second delay unit after the decision unit determines that convergence takes place.

5. The equalizer according to claim 2, further comprising:
an adder unit configured to add a signal subjected to linear equalization by the linear equalizer unit and a signal subjected to nonlinear equalization by the nonlinear equalizer unit; and
a delay unit configured to delay a signal output from the adder, wherein the delay unit delays the signal for a duration commensurate with processing delay in the temporary decision unit, and the adaptive nonlinear equalizer unit derives the plurality of coefficients based on a difference between a signal delayed by the delay unit and a signal subjected to temporary decision by the temporary decision unit, and
the linear equalizer performs linear equalization using a plurality of coefficients and uses fixed values are as the plurality of coefficients.

6. The equalizer according to claim 2,
wherein, the adaptive nonlinear equalizer unit derives a plurality of new coefficients when divergence of the plurality of coefficients is detected.

7. An equalization method comprising:
sequentially subjecting an input signal to linear equalization;
sequentially subjecting the input signal to nonlinear equalization in parallel with the linear equalization by means of an adaptive nonlinear equalizer unit implemented by a neural network;
adding a signal subjected to nonlinear equalization and a signal subjected to linear equalization;
sequentially subjecting a signal resulting from the addition to temporary decision according to a partial response rule,
determining whether the plurality of coefficients of a neural network used in the nonlinear equalization converge,
wherein the subjecting of the input signal to nonlinear equalization comprises deriving a plurality of coefficients using a signal subjected to temporary decision as a teacher signal and without using a training signal, a known input in the presence of a given output, normally required to cause a neural network to learn previously, plus performing nonlinear equalization based on the plurality of coefficients, and
unless the determining determines that convergence takes place, the adding outputs the signal subjected to linear equalization in the linear equalizing to the temporary decision instead of a signal resulting from the addition, and outputs a signal resulting from the addition to the temporary decision after the determining determines that convergence takes place.

8. A program embedded in a non-transitory computer-readable recording medium, comprising:
sequentially subjecting an input signal to linear equalization;
sequentially subjecting the input signal to nonlinear equalization in parallel with the linear equalization by means of an adaptive nonlinear equalizer unit implemented by a neural network;
adding a signal subjected to nonlinear equalization and a signal subjected to linear equalization;
sequentially subjecting a signal resulting from the addition to temporary decision according to a partial response rule,
determining whether the plurality of coefficients of a neural network used in the nonlinear equalization converge,
wherein the subjecting of the input signal to nonlinear equalization comprises deriving a plurality of coefficients using a signal subjected to temporary decision as a teacher signal and without using a training signal, a known input in the presence of a given output, normally required to cause a neural network to learn previously, plus performing nonlinear equalization based on the plurality of coefficients, and
unless the determining determines that convergence takes place, the adding outputs the signal subjected to linear equalization in the linear equalizing to the temporary decision instead of a signal resulting from the addition, and outputs a signal resulting from the addition to the temporary decision after the determining determines that convergence takes place.

* * * * *